US006519013B1

(12) United States Patent
Nagai et al.

(10) Patent No.: US 6,519,013 B1
(45) Date of Patent: Feb. 11, 2003

(54) GRAY SCALE DRIVING METHOD FOR A BIREFRINGENT LIQUID DISPLAY SERVICE

(75) Inventors: Makoto Nagai, Yokohama (JP); Takeshi Kuwata, Yokohama (JP); Masao Ozeki, Yokohama (JP)

(73) Assignees: Asahi Glass Company Ltd., Tokyo (JP); Optrex Corporation, Tokyo (JP)

( * ) Notice: Subject to any disclaimer, the term of this patent is extended or adjusted under 35 U.S.C. 154(b) by 0 days.

(21) Appl. No.: 08/945,758

(22) PCT Filed: Mar. 6, 1997

(86) PCT No.: PCT/JP97/00704

§ 371 (c)(1),
(2), (4) Date: Nov. 7, 1997

(87) PCT Pub. No.: WO97/35225

PCT Pub. Date: Sep. 25, 1997

(30) Foreign Application Priority Data

Mar. 7, 1996 (JP) .............................................. 8-050578

(51) Int. Cl.[7] .............................. G02F 1/13; G09G 3/36
(52) U.S. Cl. .............................. 349/33; 345/89; 345/94
(58) Field of Search ........................ 349/33, 34; 345/89, 345/96, 87, 94

(56) References Cited

U.S. PATENT DOCUMENTS 5,075,683 A * 12/1991 Ghis ........................... 345/89

FOREIGN PATENT DOCUMENTS

| | | |
|---|---|---|
| EP | 0 349 415 | 1/1990 |
| EP | 0 424 030 | 4/1991 |
| WO | WO 90 11546 | 10/1990 |
| WO | WO 96 23244 | 8/1996 |

OTHER PUBLICATIONS

Patent Abstracts of Japan, Publication No. 08 059525, vol. 096, No.007, Jul. 31, 1996.

* cited by examiner

*Primary Examiner*—Toan Ton
*Assistant Examiner*—Tai V. Duong
(74) *Attorney, Agent, or Firm*—Oblon, Spivak, McClelland, Maier & Neustadt, P.C.

(57) ABSTRACT

A liquid crystal display (LCD) is improved. A driving method for a LCD which has a liquid crystal layer interposed between the first electrode and the second electrode so that voltages to be applied to pixels are changed, wherein voltage levels in a selection time in a Pulse Width Modulation (PWM) driving method are the same level between two successive column electrodes so as to obtain a color display or a gray scale display which corresponds to an intermediate voltage applied to a pixel.

20 Claims, 7 Drawing Sheets

GRAY SCALE DRIVING METHOD FOR A BIREFRINGENT LIQUID DISPLAY SERVICE

BACKGROUND OF THE INVENTION

1. Field of the Invention

The present invention relates to a novel driving method for a liquid crystal display (LCD) apparatus and a driving circuit for LCD and a LCD module which have been used widely for industrial use or domestic use.

2. Discussion of the Background

Needs for information displaying media have been increasing in a highly intelligent society. Since LCDs have advantages of a light weight, thinness, lower power consumption and so on, and it well matches with semiconductor technology, further widespread use is expected. In response to this widespread usage, there is a demand for a display surface with larger capacity and high precision. In response to this, technological innovation for forming a display screen having a large capacity has been progressing.

On the other hand, there have been proposed LCDs in which features of light weight and smallness are enhanced to the maximum. Namely, it is applicable to a hand-held data terminal device which can easily be carried. In particular, a passive driving type super-twisted nematic (STN) method is considered to be the mainstream approach to this type of display in the field of hand-held data terminal devices in comparison with an active driving type using active elements such as thin film transistors (TFTs), because it can be manufactured in a shorter time, has a simple element structure, and is produced at a low cost.

Performance and specifications for such hand-held data terminal devices are considered to have a stable and good production efficiency so as to respond to demands by individuals. Further, the terminal device is required to satisfy basic performance requirements for a display device (e.g., visibility, low power consumption and high preciseness).

In conventional techniques for the above-mentioned usage, a reflection type or a semi-transparent type LCD has been used. In order to have a good visibility, various improvements have been sought. Employment of a color display instead of a monochrome display is one of them. When a color filter is used for the color display, the picture for display is divided into three portions in corresponding to three colors of red (R), green (G), and blue (B), which reduces the aperture rate remarkably.

In the case of using a color filter of the reflection type or a semi-transparent type LCD, visibility becomes poor. As a newly proposed LCD to solve such problems, there is a super-reflective-color LCD (hereinbelow, referred to as SRC-LCD). It has a device structure that does not use any color filter and realizes a bright color display without reducing the aperture rate.

In "NIKKEI MICRODEVICES", 1994, June, p. 34–39, there is introduction of a reflection type LCD having color development of white which is expected in markets, and a color developing sequence of white-red-blue-green is described in FIG. 5 in p. 38.

Further, Japanese Unexamined Patent Publication JP-A8-15691 discloses an example capable of emitting white in an achromatic color at an off state of voltage, while emitting white, red, blue and green, and an example capable of emitting white, black, blue, yellowish green and pink. SRC-LC disclosed in this publication uses two birefringent plates. Further, there is description of using a passive matrix for driving.

Further, Japanese Unexamined Patent Publication JP-A-8-176547 discloses an example which employs the liquid crystal composition including 5–60 wt % of transdifluoroethylene derivatives.

In SRC-LCD, a color display is effected, without using a color filter, by utilizing the total birefringence of polarizing plates, a twisted nematic liquid crystal layer and light passing through a phase shifting plate. The proposed technique substantially increased visibility by realizing plural kinds of color development without losing the advantages of LCD such as reduced size, light weight and simple structure. In displaying a plurality of colors in LCDs, the birefringence of the liquid crystal layer is controlled by applying a voltage across the opposed electrodes, whereby a predetermined color is developed.

The inventors of this application proposed in Japanese Patent Application JP8-9422 (Japanese Unexamined Patent publication JP-A-8-292434, International Publication WO96/23244) is a device structure for SRC-LCD, which provides an achromatic (white) display at OFF of driving voltage, is easily driven and is capable of providing a multi-colored display.

In order to obtain three or more colors in a color display of SRC, it is necessary to apply intermediate voltages. As a passive matrix driving method for STN or the like, a successive line driving of APT (Alt-Pleshko Technique) or IAPT (Improved APT) is generally used.

This technique is very effective as a multiplexing driving method because ON/OFF levels can easily be generated.

On the other hand, in an active matrix method using active elements such as TFTs, an intermediate voltage can relatively easily be produced by using amplitude modulation. In the case of the passive driving system, however, when the amplitude modulation is implemented, there are variations of voltages at a non-selection time whereby an undesired voltage is applied to a non-display portion (or a non-selected region).

Accordingly, in evaluation of the display picture as a whole, it is not always to be a suitable driving method. Therefore, there have been proposed various techniques to produce an intermediate voltage.

In conventional multigradation driving methods for STN for a monochrome display, cross-talking in a displayed surface was a big problem. Further, since the number of colors to be displayed in the multigradation driving method for SRC-LCD is practically about 4 or 5, it is considered to be unnecessary to have a multivalued function as a personal computer of full color display type. However, the voltage-optical characteristics substantially change depending on the liquid crystal material used. Accordingly, it is necessary to determine precisely a driving voltage to obtain a predetermined color tone depending on a panel for SRC-LCD to be used.

In other words, a driving controller having high universality which can be adapted to various kinds of usage should have such function that various driving voltages can easily be set as desired and with high accuracy. Namely, a multi-value driving ability of high quality is needed although a display of large capacity is unnecessary in comparison with a desk-top type personal computer.

Accordingly, in order to construct a LCD at a reduced cost and without decreasing quality of display, a further effective multivalue driving ability should be provided. In conventional passive driving methods for STN, a frame modulation or a pulse width modulation has been generally used in order to produce an intermediate voltage. Further, an amplitude modulation method has recently been proposed. Hereinbelow, description will be made as to these methods, and problems caused when these driving methods are applied to SRC-LCD will be described.

(1) Frame Modulation (FRC Method)

This is a method for displaying gradation (i.e. producing an intermediate voltage) by using a plurality of display frames. Namely, an intermediate voltage (an intermediate tone) is produced in response to the number of ON states (a higher voltage) and OFF states (a lower voltage) as binary states.

In the FRC method, when a driving voltage is divided into many stages, a flicker may be produced (in the conventional STN, brightness is changed, i.e. a gray scale appears) since an increase in the number of frames takes a longer time to complete a display. This method is often combined with a spatial modulation in which phase is spatially shifted to thereby suppress the flicker. Even in such combination, however, use of about 16 gradations is considered to be critical.

(2) Pulse Width Modulation (PWM Method)

The technique is such that a selection time is divided into $2^n$ portions to which a time of ON states and a time of OFF states are assigned. It can be considered to be a technique where FRC is effected in a frame. The PWM method has a disadvantage in that cross-talk becomes larger as a display of higher density and a larger number of gradations is to be provided, since a driving frequency is increased in proportion to the number of divided portions.

(3) Amplitude Modulation (AM Method)

In the above-mentioned passive matrix type LCD, a voltage simply in correspondence to a gradation level can not be applied, and an effective voltage of a nonselected pixel can not be applied. Accordingly, it is necessary to prevent variations of the effective voltage of a non-selected pixel. For this, there have been proposed two techniques: a technique of applying a plurality of voltages and a technique of using an imaginary electrode. In either of techniques, it is necessary to apply voltages of different levels for correction for each selection time.

Accordingly, when a multigradation display is to be effected, voltage levels in proportion to the number of gradation levels are needed. Namely, in order to display N gradations, (N−2)×2+2 levels are needed. This means that the number of levels is increased as the number of gradations is increased. An increase of the number of levels is a big factor in reduction of productivity. Further, the structure of circuit becomes complicated.

Further, in the case of SRC-LCD, a delicate adjustment of the multivalue driving voltage was necessary in response to various usages and various kinds of color to be developed. The problem of the adjustment could not be overcome even by using conventional driving methods for LCDs using a color filter.

SUMMARY OF INVENTION

The present invention is to eliminate the above-mentioned problems and to provide a driving method for LCD wherein multivalued driving voltage waveforms of high quality are formed with a high degree of freedom. Further, a driving circuit for LCD and a LCD module are provided. The present invention is applicable to both of a so-called monochrome STN and SRC-LCD.

In the first aspect of the invention, there is provided a driving method for a passive matrix type LCD having row electrodes applied with row voltages and column electrodes applied with column voltage, characterized in that a selection time for a certain pixel is divided into a P (P is a positive integer and >2) number of time periods wherein when the time periods are represented time-sequentially by T(1) to T(P), column voltages corresponding to T(1) to T(P) are in an ON level or an OFF level and the number of change between an ON level and an OFF level in a selection time for a certain pixel is zero or at most once.

In the second aspect of the invention, there is provided a driving method for LCD according to the first aspect of the invention, wherein when there are voltage levels of an ON level and an OFF level on a column electrode in a selection time for a certain row to be selected (i.e., the next electrode in timing), the same voltage level as a voltage level in T(P) on a column electrode selected just before (i.e., a preceding electrode in timing) is applied to the next electrode in T(1).

In the third aspect of the invention, there is provided a driving method for LCD according to the first or second aspect of the invention, wherein when a voltage level on a column electrode in T(1) in a selection time for a certain row is an ON level and a column electrode (i.e., an adjacent electrode) in a column adjacent to the column electrode is applied with an ON level or an OFF level, a voltage level of OFF is applied to the adjacent electrode in T(1), and when a voltage level on a column electrode in T(1) in a selection time for a certain row is an OFF level and a column electrode (i.e., an adjacent electrode) in a column adjacent to the column electrode is applied with an ON level or an OFF level, a voltage level of ON is applied to the adjacent electrode in T(1).

In the fourth aspect of the invention, there is provided a driving method for LCD according to the first or second aspect of the invention, wherein when a voltage level applied to a column electrode in T(P) in a selection time for a certain row is an ON level and a voltage level applied to a column electrode adjacent to a certain column is an ON level or an OFF level, a voltage level in T(P) on a column electrode adjacent to said column electrode is an OFF level, and when a voltage level applied to a column electrode in T(P) in a selection time for a certain row is an ON level and a voltage level applied to a column electrode adjacent to a certain column is an ON level or an OFF level, a voltage level in T(P) on a column electrode adjacent to said column electrode is an OFF level.

In the fifth aspect of the invention, there is provided a driving method for LCD according to any one of the first through fourth aspect of the invention, wherein P is 16 or lower.

Further, in a driving method for LCD according to any one of the first through fifth aspect of the invention, it is preferable that on column electrodes in a selection time for a certain row, there is no change from an ON level to an OFF level or from an OFF level to an ON level between T(1) and T(2) or T(P−1) and T(P).

In the sixth aspect of the invention, there is provided a driving method for LCD according to any one of the first through fifth aspect of the invention, wherein in satisfaction of $W*1/P \leqq 0.25$ (where W is the greatest integer) and on column electrodes in a selection time for a certain row, there is no change from an ON level to an OFF level or from an OFF level to an ON level between T(1) and T(W) or T(P−W) and T(P). Further, it is more preferable that $W*1/P \leqq 0.2$.

In the seventh aspect of the invention, there is provided a driving method for LCD according to any one of the first through sixth aspect of the invention, wherein when the ratio of a time of ON level to a selection time for column electrodes corresponding to a certain pixel is R (a time of ON level/a selection time), and a (P+1) number of different R(S) values ($0 \leqq R(S) \leqq 100\%$) which are determined by $R(S)=(1/P)*S*100\%$ (S is an integer of any value of P or lower including 0) are defined, and X frames including a Q or lower number (an integer of $Q \leqq (p+1)$) of different R(S) values are used as a unit to drive LCD.

In the eighth aspect of the invention, there is provided a driving method for LCD according to the seventh aspect of the invention, wherein a difference between R(S) values in X frames does not exceed 30%.

In the seventh aspect of the invention, it is further preferable that a difference between R(S) values in X frames does not exceed 15%.

Further, in any one of the first through eighth aspects of the invention, it is preferable that in R(S) values in X frames, S is a combination of U or U+1 ($0 \leqq U$, $U+1 \leqq P$ and U is an integer).

In the ninth aspect of the invention, there is provided a driving method for LCD according to any one of the first through eighth aspects of the invention, wherein X is 7 or lower.

Further, in the ninth aspect of the invention, it is preferable that X is 4 or lower. Further, in any one of the preceding aspect of the invention, it is preferable that P is 9 or lower.

In the tenth aspect of the invention, there is provided a driving method for LCD according to the seventh aspect of the invention, all R(S) values in X frames are not 0% or 100%.

The driving method for LCD described above is applicable to any of a monochrome STN, STN with a color filter and SRC-LCD describe hereinafter.

In the eleventh aspect of the invention, there is provided a LCD module comprising:

a nematic liquid crystal layer having a positive dielectric anisotropy and including a chiral material, which is interposed between two substrates disposed substantially in parallel, each provided with a transparent electrode and an aligning layer, wherein the twist angle of the liquid crystal layer by the aligning direction of liquid crystal molecules, which is determined by the aligning layer of each of the substrates, is 160°–300°;

a pair of polarizing plates disposed outside the liquid crystal layer, and a driving circuit for applying a driving voltage across the transparent electrodes, the LCD module being characterized in that: a birefringent plate is disposed between the liquid crystal layer and one of the pair of polarizing plates; in the two substrates, the substrate adjacent to the birefringent plate is the first substrate and the other is the second substrate;

the product $\Delta n_1 \cdot d_1$ of the refractive index anisotropy $\Delta n_1$ of the liquid crystal in the liquid crystal layer and the thickness d1 of the liquid crystal layer is 1.2 $\mu$m–2.5 gym; the birefringent plate is so formed as to have a relation of $n_X \geqq n_Z \geqq n_Y$ wherein $n_X$ and $n_Y$ respectively represent the refractive index ($n_X > n_Y$) in the direction of film plane of the birefringent plate, and $n_Z$ represents the refractive index in the direction of thickness of the birefringent plate;

the sum $\Delta n_2 \cdot d_2$ of the refractive index anisotropy between a slow axis (a direction of $n_X$ in the film plane) and a fast axis (a direction of $n_Y$ in the film plane) and the birefringence in the vertical direction corresponding to the thickness is 1.2 $\mu$m–2.5 $\mu$m, wherein a driving method for LCD according to anyone of the first through tenth aspect of the invention is conducted so that at least three kinds of voltage values are selected so as to be applied across the transparent electrodes for a color display by multiplexing driving.

In the eleventh aspect of the invention, it is preferable that the twist angle of the liquid crystal layer is 230°–250°; $\Delta n_1 \cdot d_1$ is 1.2 $\mu$m–1.3 $\mu$m; $\Delta n_2 \cdot d_2$ is 1.3 $\mu$m–1.5 $\mu$m; $\theta_2$ is 70°–90°; $\theta_1$ is 115°–135° and $\theta_3$ is 130°–150°. The refractive index anisotropy of the liquid crystal should be $\Delta n \geqq 0.15$; the viscosity $\geqq 25$ cSt; the dielectric anisotropy $\Delta \epsilon > 15$ and $Tc \geqq 95°$ C.

Further, in the eleventh aspect, it is preferable that the liquid crystal composition includes 5–60 wt % of trans-difluoroethylene derivatives (which can be expressed by a general formula of $R^1$—$(Cy)_n$—Cy—CF═CF—Ph—$R^2$ where Cy: a trans-1,4-cyclohexylene group, Ph: a 1,4-phenylene group and R1, R2: an alkyl group) for high speed response. Since frequency dependence of the dielectric anisotropy of liquid crystal tends to increase in a low temperature region (−20° C.), liquid crystal of lower frequency dependence should be used. Specifically, it is preferable to use liquid crystal which exhibits a 20 ratio of $V_{th}(V_{th}(3\ kHz)/V_{th}(400\ Hz)$ of 1.05 or lower wherein the liquid crystal is driven by a sine wave of 3 kHz and a sine wave of 400 Hz respectively. In the twelfth aspect of the invention, there is provided a driving circuit for LCDs of a passive matrix type comprising:

a control circuit for producing at least 4 intermediate voltage levels, and an output circuit for producing voltages to be applied to row electrodes and column electrodes so that row voltages are applied to the row electrodes and column voltages are applied to the column electrodes, the driving circuit being characterized in that driving voltages are produced in such a manner that a selection time for a certain pixel of LCDs is divided into a P (P is a positive integer) number of time periods wherein when the time periods are represented time-sequentially by T(1) to T(P), column voltages corresponding to T(1) to T(P) are in an ON level or an OFF level. Further, it is preferable that at least 10 intermediate voltage levels are produced.

In the thirteenth aspect of the invention, there is provided a driving circuit for LCDs according to the twelfth aspect of the invention, wherein at least 16 intermediate voltage levels are provided.

In the fourteenth aspect of the invention, there is provided a driving circuit for LCD according to the twelfth or thirteenth aspect of the invention, wherein the number of the column electrodes is at least 60. In the twelfth, thirteenth or fourteenth aspect of the invention, the circuits are preferably constituted by monolithic integrated circuits. The present invention is to provide a newly formulated driving method for SRC-LCD. In particular, the present invention is to provide a method of driving liquid crystal economically without reducing the quality of a display and at a low power consumption rate by using a successively line driving method in combination of a FRC method and a PWM method.

As described before, when multivalued voltages of N levels (hereinbelow, referred to as simply "gradations". Note that the term is different from "gray scale" which means an intermediate potential in a monochrome display) are realized by using only the FRC method, it is necessary to form (N−1) frames to obtain predetermined gradations. When there are many gradations, a flicker takes place. Even in a case using a spatial modulation, wherein phases of ON and OFF are shifted for adjacent pixels, a display of 8 to 16 gradations is critical in general.

As to how many gradations are required in SRC-LCD, there are two restrictive conditions. For easy understanding, assuming that a voltage range from an ON state to an OFF state to be applied to liquid crystal is divided equally to 100. In general, one of the restrictive conditions is that when the substantial center of an applied voltage by which a specified color is developed is x%, there is an effective range slightly apart from x% which can be recognized as the specified color. The quantity of deviation is referred to as $\Delta x\%$. In this case, a number of gradations of at least $100/\Delta x$ is needed. In this case, further, it is necessary that a requisite number of gradations is assigned equally in a range of 0–100% since values of applied voltage vary depending on a liquid crystal material used and so on.

However, the restrictive conditions are sometimes relaxed because liquid crystal has a non-linear characteristic to voltage in the vicinity of 0% or 100%. Accordingly, if a margin of 5% is given, 20 gradations are necessary, which can not be obtained by using only the FRC method. A case of using solely a conventional gradation method will be examined.

Use of a PWM method can realize a requisite number of gradations. However, when a selection time is divided into, for instance 25 portions, the driving frequency is increased by 25 times. This increases power consumed for the entire system, and a display of poor quality is provided due to a cross-talk (trailing) which is caused by a strain in the waveform of applied voltage. On the other hand, in an AM method, voltage levels in proportion to the number of gradations are necessary, and a substantial increase of cost is invited which is not realistic.

According to the present invention, there is provided a method capable of realizing gradations effectively with a low power consumption, without reducing quality in display and with a simple construction. Assignment of a plurality of gradation levels obtained by a PWM method for each frame increases dramatically the number of gradations.

First, application to the PWM method is described. In a conventional PWM method, weighting was conducted to input bits to obtain a necessary number of gradations as shown in FIG. 2. In the present invention, however, weighting is conducted with equal distances as shown in FIG. 1. The difference between the conventional method and the present invention is described by using a 16 gradation display (divided numbers: 1+2+4+8⇒15+"0"=16 gradation).

In FIG. 2, the waveform on a column electrode corresponding to input data of the 5th gradation has ON states at the first bit (reference numeral: 3*a*) and the 3rd bit (reference numeral: 3*c*). OFF states appear at the 2nd bit (reference numeral: 4*b*) and the 4th bit (reference numeral: 4*d*). Accordingly, it is understood that a level change of the driving voltage takes place 3 times. In FIG. 2, references 4*a*, 3*b*, 4*c*, and 3*d* merely refer to the inversion of the ON state and OFF state of the above-discussed bits. In FIG. 2, references 1*a*–1*d* refer to the durations of the pulse widths of the conventional PWM method.

On the other hand, a case of dividing uniformly a selection time into 15 portions to display 16 gradations in FIG. 1, is examined. For instance, uniformly divided time periods are formed in one selection time 2, and adjustment is conducted depending on the number of the uniformly divided time periods. A reference numeral 3A indicates an ON state and a reference numeral 4B indicates an OFF state. When the waveform of column electrode is changed for a predetermined number of gradations as shown in FIG. 1, the level change of the waveform will be within once. Whether the number of turns of the level change is large or small, is significant. Actually, liquid crystal is generally driven with voltages having a rectangular waveform. Since the liquid crystal itself has an electric load and a circuit for driving has a load, the waveform has a certain distortion due to a time constant in comparison with an ideal waveform.

In this case, electric loss is smaller as the number of turns of the level change is smaller, whereby crosstalking can be reduced. Accordingly, when gradation levels are provided by weighting to be uniform distances as shown in FIG. 1, and the waveform on column electrode are made in correspondence to the gradation levels as shown in FIG. 1, the number of turns of voltage levels can be controlled within once in a selection term. In this case, the effective voltage applied is equivalent. In FIG. 1, specifically, the level change from an ON state 3A to an OFF state 4B is only once. In FIG. 1, references 4A and 3B merely indicate the inversion of ON state 3A and OFF state 4B, respectively.

In a case of obtaining a predetermined number of gradations, it is determined in the PWM method at first. Then, the gradations obtained in the PWM method are rearranged in the order from higher value of applied voltages. The rearranged gradations are called gradation levels of PWM.

As described before, when a selection time is equally divided into N, a display having (N+1) gradations can be effected. In the gradation levels of PWM, all of (N+1) gradations can be used. However, for (N+1) gradations, when a gradation level (1) is determined to be ON and other gradation levels are rearranged in order, and a gradation level (N+1) is to be OFF, the frequency component of the waveform of a column for the gradation level (2) is N times as large as that of a gradation level (1).

In general, it is known that the voltage vs brightness characteristics of liquid crystal are changed depending on a frequency component of an applied voltage. There is a case that a frequency component of a waveform of a column is in an extremely high frequency region when a specified display pattern is to be displayed. For instance, when a bar is displayed in an ON-OFF stripe display in the background of ON (i.e., a display pattern of U) as shown in FIG. 3, a point indicated by a reference numeral 10 has a different degree of brightness from a point indicated by a reference numeral 11 although they are both portions of ON.

Accordingly, the basic component of driving frequency has to be maintained in a specified region for all gradation levels. In order to assure this, it is effective not to use a gradation level (2) or (N). If these gradation levels at both ends are not used, a high frequency region of waveforms of column corresponding to all gradations can be reduced to a frequency of one half.

Further, a gradation level (3) or (N−1) may be omitted in consideration of frequency dependence in a specified kind of liquid crystal, if necessary. In this case, however, discontinuity of gradation levels may be increased. When a color display is conducted by SRC-LCD, however, there is less problem because gradation levels required for displaying colors are deviated toward an intermediate portion rather than ON and OFF levels at both ends.

Further, the following factors can be taken for relaxing the number of turns of change and the frequency dependence of applied waveforms. Specifically, the phase of waveforms of column corresponding to gradation levels in the PWM method is reversed in terms of adjacent time (i.e., in the direction of row in a displayed picture) and adjacent space (i.e., in the direction of column in a displayed picture).

A case that a selection time is divided uniformly into 5 portions will be described with reference to FIG. 4. Phases of the waveform of column are defined as follows. When a certain gradation level of PWM (i.e., an intermediate tone other than ON or OFF) is to be provided, a state of the waveform of column wherein ON appears earlier in terms of time in all gradations is referred to as a positive phase, such state being shown in column waveforms (A) in FIG. 4.

A state wherein ON appears later in terms of time as shown in column waveforms (B) in FIG. 4 is referred to as a negative phase (however, the effective voltages in both cases are equivalent). As shown in FIG. 5(*b*), when the phase of the waveform of column is reversed from a positive phase to a negative phase and vice versa for each selection time, it is understood that the number of changes of a column voltage is reduced in comparison with a case of regular waveform as shown in FIG. 5(*a*). Further, since pulse widths are increased, a frequency component of waveform of column corresponding to all gradations is also reduced.

Further, when a phase between adjacent columns on the same row is inversed as shown in FIG. 6, a possibility of dispersing a power source load to a level of each waveform of column is increased, whereby a time constant is reduced to minimize a waveform distortion whereby the quality of display is improved.

In summary, a relation of pixels in a selected state and phases on the pixels is as follows. For data indicating positions of pixels, a coordinate X (1 bit) is taken in the direction of row lines wherein X=0 represents an odd row and X=1 represents an even row. A coordinate Y (1 bit) is taken in the direction of column lines wherein Y=1 represents an odd column and Y=0 represents an even column. It is assumed that when X+Y=1, a positive phase is provided and when X+Y=0, a negative phase is provided.

Generally, there are many cases that the same gradation levels are used as display data in substantially the entire portion or a partial portion of a display picture. In such cases, the above-mentioned technique is particularly effective. According to the technique described above, the method of selecting gradation levels and the method of outputting waveforms of columns in the PWM method are determined.

Now, determination as to how the gradation levels in the PWM method are distributed in time-sequential axis, is made. In the present invention, a FRC method is used to increase the number of gradations by distributing a plurality of gradation levels obtained by the PWM method for frames. The following is a detailed explanation.

For instance, it is assumed that 4 gradations are obtained by the PWM method. A problem caused by the application of the number of gradations to the FRC method is a flicker. The flicker can be suppressed by optimizing distribution of levels in the PWM method and phase modulation. First, the distribution of levels in the PWM method will be described. There are numerous numbers of possible combination of levels in PWM method and FRC method. However, many of these combinations can not be adopted because a flicker takes place. Accordingly, in order to obtain a predetermined gradation, gradation levels in the PWM method, which are used in a plurality of frames, should be levels having values close to each other.

It is difficult to recognize by human eyes a transient optical phenomenon caused by level changes in the PWM method for each frame. Further, when levels in the PWM method are so arranged to have periodicity with a unit of 2 frames in combination of the FRC method having a unit of 4 frames, occurrence of a flicker is small in comparison with a case of using periodicity of a unit of 4 frames because a change of brightness takes place at a period of 2 frames.

The above-mentioned technique can be expressed as a sequence of gradation levels in the PWM method for frames necessary to produce each gradation. The sequence is shown in Table 1. In the case shown in Table 1, 4 frames are used as levels in the FRC method and 4 levels for levels in the PWM method. However, the number of frames is not limited in the present invention. Further, combination to a different number of frames is not in particular limited. In Table 1, symbols of ± indicates that there is a change of voltage level in a selection time and a symbol of ○ indicates that a voltage level is constant.

TABLE 1

| Sequence Gradation level | Frame #1 | #2 | #3 | #4 | |
|---|---|---|---|---|---|
| 1 | 1 | 1 | 1 | 1 | ○ |
| 2 | 1 | 1 | 1 | 2 | ± |
| 3 | 1 | 2 | 1 | 2 | ± |
| 4 | 1 | 2 | 2 | 2 | ± |
| 5 | 2 | 2 | 2 | 2 | ± |
| 6 | 2 | 2 | 2 | 3 | ± |
| 7 | 2 | 3 | 2 | 3 | ± |
| 8 | 2 | 3 | 3 | 3 | ± |
| 9 | 3 | 3 | 3 | 3 | ± |
| 10 | 3 | 3 | 3 | 4 | ± |
| 11 | 3 | 4 | 3 | 4 | ± |
| 12 | 3 | 4 | 4 | 4 | ± |
| 13 | 4 | 4 | 4 | 4 | ○ |

Now, description is made as to the phase modulation. In the sequence of gradation levels in the PWM method used for displaying a predetermined gradation level, the sequence is moved between adjacent pixels. As shown in Table 1, when the level in the PWM method is to be 4 levels and the level in the FRC method is to be 4 frames, phases of the level in the PWM for each of adjacent pixels in each frame are determined as shown in Table 2 described below.

TABLE 2

| | 1st frame | | 2nd frame | | 3rd frame | | 4th frame | |
|---|---|---|---|---|---|---|---|---|
| | Y = 0 | Y = 1 | Y = 0 | Y = 1 | Y = 0 | Y = 1 | Y = 0 | Y = 1 |
| x = 0 | #1 | #2 | #2 | #3 | #3 | #4 | #4 | #1 |
| x = 1 | #4 | #3 | #1 | #4 | #2 | #1 | #3 | #2 |

#1–#4 represent gradation levels in the PWM method in Table 1. For instance, when a gradation level 7 is displayed, gradation levels of PWM method of 2, 3, 2, 3 are successively applied to the first frame, to the fourth frame, and to the dot at X=0 and Y=0; gradation levels of 3, 2, 3, 2 are sequentially applied to the first frame, to the fourth frame, and to the dot at X=1 and Y=0; gradation levels of PWM method of 3, 2, 3, 2 are sequentially applied to the first frame, to the fourth frame, and to the dot at X=0, Y=1; and gradation levels of 2, 3, 2, 3 are sequentially applied to the first frame, to the fourth frame, and to the dot at X=1, Y=1.

The above-mentioned figures indicate phases in the sequence of gradation levels of the PWM method to obtain a predetermined gradation level. This is called a phase table. With use of the table, averaged brightness in each phase table from the first frame to the fourth frame is uniform, and a flicker is difficult to see. The phase table itself is often used in the FRC method.

As described above, in the present invention, a PWM method and a FRC method are used with satisfaction of a specified relation to drive liquid crystal whereby a picture image of high quality can be provided without reducing advantages in each of the driving methods.

In the present invention, a sequence of levels in the PWM method can easily be determined from input data. Accordingly, a logic circuit can easily be formed thereby reducing cost and power consumption rate.

In the following, a concrete device structure for SRC-LCD will be described in detail. In order to distinguish the structure from the invention of the first group relating to the driving method as described above, it is called hereinafter the invention of the second group.

In the first aspect of SRC-LCD as the invention of the second group, there is provided a color liquid crystal display apparatus comprising: a nematic liquid crystal layer having a positive dielectric anisotropy and including a chiral material, which is interposed between two substrates disposed substantially in parallel to each other, each provided with a transparent electrode and an aligning layer, wherein the twist angle of the liquid crystal layer by the aligning direction of liquid crystal molecules, which is determined by the aligning layer of each of the substrates, is 160°–300°;

a pair of polarizing plates disposed outside the liquid crystal layer; and a driving circuit for applying a driving voltage across the transparent electrodes, the color liquid crystal display apparatus being characterized in that:

a birefringent plate is disposed between the liquid crystal layer and either one of the pair of polarizing plates;

in the two substrates, the substrate adjacent to the birefringent plate is the first substrate and the other is the second substrate;

the product $\Delta n_1 \cdot d_1$ of the refractive index anisotropy $\Delta n_1$ of the liquid crystal in the liquid crystal layer and the thickness d1 thereof is 1.2 μm–2.5 μm;

the birefringent plate is so formed as to have a relation of $n_x \geqq n_z \geqq n_y$ wherein $n_x$ and $n_y$ represent refractive indices ($n_x > n_y$) in the direction of film plane of the birefringent plate, and $n_z$ represents the refractive index in the direction of thickness of the birefringent plate;

the sum $\Delta n_2 \cdot d_2$ of the refractive index anisotropy between a slow axis (a direction of $n_x$ in the film plane) and a fast axis (a direction of $n_y$ in the film plane) and the birefringence in the vertical direction corresponding to the thickness is 1.2 μm–2.5 μm, whereby at least three kinds of voltage values are selected so as to be applied across the transparent electrodes by multiplexing driving.

In the first aspect of the invention, a case of $n_x = n_z = n_y$ is excluded; a case of $n_x > n_z > n_y$ means a biaxial refringent plate, and a case of $n_x = n_z > n_y$ or $n_x > n_z = n_y$ means a uniaxial birefringent plate.

In the second aspect of the invention, there is provided a color liquid crystal display apparatus according to the first aspect of the invention wherein the refractive index of the birefringent plate is in the range of the following formula 1:

$$0.7 \geqq N_z = (n_x - n_z)/(n_x - n_y) \geqq 0.2 \quad (1)$$

In the third aspect of the invention, there is provided a color liquid crystal display apparatus according to the first or the second aspect of the invention wherein $1.0{*}\Delta n_2 \cdot d_2 \leqq \Delta n_1 \cdot d_1 \leqq 1.2 \cdot \Delta n_2 \cdot d_2$ is satisfied.

In the fourth aspect of the invention, there is provided a color liquid crystal display apparatus according to the first or the second aspect of the invention wherein when the combination of values of $\Delta n_1 \cdot d_1$ and $\Delta n_2 \cdot d_2$ used is expressed by a vector of ($\Delta n_1 \cdot d_1$ and $\Delta n_2 \cdot d_2$), $\Delta n_1 \cdot d_2$ and $\Delta n_2 \cdot d_2$ selected from a region surrounded by $L_1$(1.3,1.4), $L_2$(1.4,1.4), $L_3$(1.3, 1.5), $L_4$(1.75,1.75), $L_5$(1.75,1.85), $L_6$(1.65,1.85) are used.

In the fifth aspect of the invention, there is provided a color liquid crystal display apparatus according to anyone of the first to the fourth aspect of the invention wherein the twist angle of the liquid crystal layer is 160°–260°, the angle $\theta_2$ formed by the slow axis and the orientation of the liquid crystal molecules at the first substrate side is 75°–110°: the angle $\theta_1$ formed by the polarizing axis or the absorbing axis of the polarizing plate at the first substrate side and the orientation of the liquid crystal molecules is 120°–165°, and the angle $\theta_3$ formed by the polarizing axis or the absorbing axis of the polarizing plate at the second substrate side and the orientation of the liquid crystal molecules at the second substrate side is 115°155°.

In the sixth aspect of the invention, there is provided a color liquid crystal display apparatus according to the fifth aspect of the invention wherein the twist angle of the liquid crystal layer is 220°–260°.

In the seventh aspect of the invention, there is provided a color liquid crystal display apparatus according to the first or the second aspect of the invention wherein the twist angle of the liquid crystal layer is 220°–260°: $\Delta n_1 \cdot d_1$ is 1.3 μm–1.8 μm; $\Delta n_2 \cdot d_2$ is 1.4 μm–1.9 μm; the angle $\theta_2$ formed by the slow axis and the orientation of the liquid crystal molecules at the first substrate side is 75°–110°; the angle $\theta_1$ formed by the polarizing axis or the absorbing axis of the polarizing plate at the first substrate side and the orientation of the liquid crystal molecules is 120°–165°, and the angle $\theta_3$ formed by the polarizing axis or the absorbing axis of the polarizing plate at the second substrate side and the orientation of the liquid crystal molecules at the second substrate side is 120°–150°.

In the eighth aspect of the invention, there is provided a color liquid crystal display apparatus according to the first or the second aspect of the invention wherein the twist angle of the liquid crystal layer is 230°–250°: $\Delta n_1 \cdot d_1$ is 1.3 μm–1.4 μm; $\Delta n_2 \cdot d_2$ is 1.4 μm–1.5 μm; the angle $\theta_2$ formed by the slow axis and the orientation of the liquid crystal molecules at the first substrate side is 90°–110°; the angle $\theta_1$ formed by the polarizing axis or the absorbing axis of the polarizing plate at the first substrate side and the orientation of the liquid crystal molecules is 130°–150°, and the angle $\theta_3$ formed by the polarizing axis or the absorbing axis of the polarizing plate at the second substrate side and the orientation of the liquid crystal molecules at the second substrate side is 125°–145°.

In the ninth aspect of the invention, there is provided a color liquid crystal display apparatus according to the first or the second aspect of the invention wherein the twist angle of the liquid crystal layer is 230°–250°: $\Delta n_1 \cdot d_1$ is 1.65 μm–1.75 μm; $\Delta n_2 \cdot d_2$ is 1.75 μm–1.85 μm; the angle $\theta_2$ formed by the slow axis and the orientation of the liquid crystal molecules at the first substrate side is 85°–105°; the angle $\theta_1$ formed by the polarizing axis or the absorbing axis of the polarizing plate at the first substrate side and the orientation of the liquid crystal molecules is 140°–160°, and the angle $\theta_3$ formed by the polarizing axis or the absorbing axis of the polarizing plate at the second substrate side and the orientation of the liquid crystal molecules at the second substrate side is 125°–145°.

In the tenth aspect of the invention, there is provided a color liquid crystal display apparatus according to the first or the second aspect of the invention wherein the twist angle of the liquid crystal layer is 230°–250°: $\Delta n_1 \cdot d_1$ is 1.65 $\mu$m–1.75 $\mu$m; $\Delta n_2 \cdot d_2$ is 1.75 $\mu$m–1.85 $\mu$m; the angle $\theta_2$ formed by the slow axis and the orientation of the liquid crystal molecules at the first substrate side is 90°–110°; the angle $\theta_1$ formed by the polarizing axis or the absorbing axis of the polarizing plate at the first substrate side and the orientation of the liquid crystal molecules is 145°–165°, and the angle $\theta_3$ formed by the polarizing axis or the absorbing axis of the polarizing plate at the second substrate side and the orientation of the liquid crystal molecules at the second substrate side is 125°–145°.

In the eleventh aspect of the invention, there is provided a color liquid crystal display apparatus according to the first or the second aspect of the invention wherein the twist angle of the liquid crystal layer is 230°–250°: $\Delta n_1 \cdot d_1$ is 1.9 $\mu$m–2.1 $\mu$m; $\Delta n_2 \cdot d_2$ is 2.0 $\mu$m–2.2 $\mu$m; the angle $\theta_2$ formed by the slow axis and the orientation of the liquid crystal molecules at the first substrate side is 85°–105°; the angle $\theta_1$ formed by the polarizing axis or the absorbing axis of the polarizing plate at the first substrate side and the orientation of the liquid crystal molecules is 130°–150°, and the angle $\theta_3$ formed by the polarizing axis or the absorbing axis of the polarizing plate at the second substrate side and the orientation of the liquid crystal molecules at the second substrate side is 125°–145°.

In the twelfth aspect of the invention, there is provided a color liquid crystal display apparatus according to the first or the second aspect of the invention wherein the twist angle of the liquid crystal layer is 230°–250°: $\Delta n_1 \cdot d_1$ is 1.9 $\mu$m–2.1 $\mu$m; $Ln_2$–$d_2$ is 1.65 $\mu$m–1.85 $\mu$m; the angle $\theta_2$ formed by the slow axis and the orientation of the liquid crystal molecules at the first substrate side is 75°–95°; the angle $\theta_1$ formed by the polarizing axis or the absorbing axis of the polarizing plate at the first substrate side and the orientation of the liquid crystal molecules is 300–50°, and the angle $\theta_3$ formed by the polarizing axis or the absorbing axis of the polarizing plate at the second substrate side and the orientation of the liquid crystal molecules at the second substrate side is 125°–145°.

In the thirteenth aspect of the invention, there is provided a color liquid crystal display apparatus according to the first or the second aspect of the invention wherein the twist angle of the liquid crystal layer is 230°–250°: $\Delta n_1 \cdot d_1$ is 1.9 $\mu$m–2.1 $\mu$m; $\Delta n_2 \cdot d_2$ is 1.9 $\mu$m–2.1 $\mu$m; the angle $\theta_2$ formed by the slow axis and the orientation of the liquid crystal molecules at the first substrate side is 75°–95°; the angle $\theta_1$ formed by the polarizing axis or the absorbing axis of the polarizing plate at the first substrate side and the orientation of the liquid crystal molecules is 120°–140°, and the angle $\theta_3$ formed by the polarizing axis or the absorbing axis of the polarizing plate at the second substrate side and the orientation of the liquid crystal molecules at the second substrate side is 1250–145°.

In the fourteenth aspect of the invention, there is provided a color liquid crystal display apparatus according to the first or the second aspect of the invention wherein the twist angle of the liquid crystal layer is 230°–250°: $\Delta n_1 \cdot d_1$ is 1.7 $\mu$m–1.85 $\mu$m; $\Delta n_2 \cdot d_2$ is 1.75 $\mu$m–1.95 $\mu$m; the angle $\theta_2$ formed by the slow axis and the orientation of the liquid crystal molecules at the first substrate side is 85°–105°; the angle $\theta_1$ formed by the polarizing axis or the absorbing axis of the polarizing plate at the first substrate side and the orientation of the liquid crystal molecules is 140°–160°, and the angle $\theta_3$ formed by the polarizing axis or the absorbing axis of the polarizing plate at the second substrate side and the orientation of the liquid crystal molecules at the second substrate side is 125°–145°.

In the fifteenth aspect of the invention, there is provided a color liquid crystal display apparatus according to the first or the second aspect of the invention wherein the twist angle of the liquid crystal layer is 230°–250°: $\Delta n_1 \cdot d_1$ is 2.3 $\mu$m–2.5 $\mu$m; $\Delta n_2 \cdot d_2$ is 2.2 $\mu$m–2.5 $\mu$m; the angle $\theta_2$ formed by the slow axis and the orientation of the liquid crystal molecules at the first substrate side is 75°–95°; the angle $\theta_1$ formed by the polarizing axis or the absorbing axis of the polarizing plate at the first substrate side and the orientation of the liquid crystal molecules is 125°–145°, and the angle $\theta_3$ formed by the polarizing axis or the absorbing axis of the polarizing plate at the second substrate side and the orientation of the liquid crystal molecules at the second substrate side is 125°–145°.

In the sixteenth aspect of the invention, there is provided a color liquid crystal display apparatus according to the first or the second aspect of the invention wherein the twist angle of the liquid crystal layer is 230°–250°: $\Delta n_{\cdot d1}$ is 1.6 $\mu$m–1.8 $\mu$m; $\Delta n_2 \cdot d_2$ is 1.2 $\mu$m–1.4 $\mu$m; the angle $\theta_2$ formed by the slow axis and the orientation of the liquid crystal molecules at the first substrate side is 90°–110°; the angle $\theta_1$ formed by the polarizing axis or the absorbing axis of the polarizing plate at the first substrate side and the orientation of the liquid crystal molecules is 140°–160°, and the angle $\theta_3$ formed by the polarizing axis or the absorbing axis of the polarizing plate at the second substrate side and the orientation of the liquid crystal molecules at the second substrate side is 125°–145°.

In the seventeenth aspect of the invention, there is provided a color liquid crystal display apparatus according to anyone of the first through the sixteenth aspect of the invention wherein a reflection plate is provided.

In a general state of use of the above-mentioned SRC-LCD, it is preferable that an interline space is achromatic. Namely, when no voltage is applied, an achromatic color is desirable. When an achromatic color is to be provided with a voltage corresponding to a half tone, liquid crystal exhibits a steep change even by a slight change at an intermediate voltage. Accordingly, there is a change of color development even in a slight variation of voltage when an achromatic display is to be effected in its entirety. As a result, a beautiful achromatic display can not be obtained.

The same situation is applicable when a color resulted from an intermediate voltage is displayed in the entire region. Generally, an achromatic color is often used as a background color. In this case, the achromatic color occupies a large surface area. When there is unevenness of color which occupies a large surface area, the quality of a display is greatly reduced. Therefore, in order to provide a uniform color, it is desirable not to cause color development in the achromatic color at an intermediate voltage.

In consideration of the above-mentioned problem, it is preferable to obtain an achromatic color at the time of application of no voltage or at the time of an OFF waveform in multiplexing driving.

In SRC-LCD of the present invention, the twist angle of the liquid crystal molecules interposed between the both electrodes is determined in a range of 160°–300°. When the twist angle is less than 160°, a change in a state of liquid crystal caused when the liquid crystal is subjected to time-shearing driving at a high duty ratio which requires a steep change of transmittance, is small. On the other hand, when the twist angle is more than 300°, there easily causes hysteresis or domain by which light is scattered.

Further, the product $\Delta n_1 \cdot d_1$ of the refractive index anisotropy ($\Delta n_1$) of the liquid crystal in the liquid crystal layer and the thickness ($d_1$) of the liquid crystal layer is determined to be 1.2 μm–2.5 μm. When the product is less than 1.2 μm, a change in a state of the liquid crystal to which voltage is applied, is small. On the other hand, when the product is more than 2.5 μm, it is difficult to display an achromatic color, or the viewing angle and the response characteristics become inferior. In particular, in order to develop an achromatic color and to increase a color change with respect to an applied voltage, it is desirable that An,dl of the liquid crystal layer is 1.2 μm–1.8 μm, more preferably, 1.3 μm–1.8 μm.

The value $\Delta n_1 \cdot d_1$ should be satisfied in a temperature range for using the liquid crystal display element, and it is possible to display a beautiful picture in the temperature range of use. However, when the performance of the liquid crystal display element is required for outdoor use, there is a case that this relation is satisfied only in a part of the temperature range of use. In this case, if the value of $\Delta n_{1 \cdot d1}$ is out of the abovementioned range, a desired color can not be obtained or there is found reduction in the viewing angle characteristics. The element structure of the color liquid crystal display apparatus for SRC-LCD will be described. A transparent electrode such as ITO($In_2O_3$—$SnO_2$), $SnO_2$ or the like is formed on a surface of each of substrates such as plastic, glass or the like, and the transparent electrodes are patterned to have a predetermined pattern. A film of polyimide, polyamide or the like is formed on the surface of each of the substrates. The front surface of the film is subjected to rubbing or oblique vapor deposition of SiO or the like to thereby form an aligning layer. Between the substrates with transparent electrodes, a liquid crystal layer including a nematic liquid crystal having a positive dielectric anisotropy wherein the liquid crystal has a twisted angle of 160°–300°, is interposed.

As a typical example of the element structure, there is a dot matrix liquid crystal display element having a large number of electrodes arranged in a matrix form wherein 640 electrodes are formed in a form of stripe on either of the substrates and 400 electrodes are formed in a form of stripe on the other substrate so as to be perpendicular, whereby a display of 640×400 dots is formed. Generally, the size of a pixel forming a dot is about 270 μm×270 μm, and spaces between pixels are about 30 μm.

An insulating film such as $TiO_2$, $SiO_2$, $Al_2O_3$ or the like may be formed between the electrodes and the aligning layer in order to prevent short circuit between them, or a lead electrode of low resistance such as Al, Cr, Ti or the like, may be additionally attached to the transparent electrodes.

A pair of polarizing plates are disposed at outer sides of the liquid crystal layer. Generally, the polarizing plates are disposed at the outsides of the substrates which form a cell. Depending on the performance of the liquid crystal display element, any of the substrates themselves may be formed with a polarizing plate and a birefringent plate, or a birefringent layer and a polarizing layer may be disposed between the substrate and the electrode. The birefringent plate should be disposed between the liquid crystal layer and the polarizing plate. For instance, it should be disposed in the form of layer between the liquid crystal layer and the electrode; or it should be disposed in a form of layer between the electrode and the substrate; or the substrate itself may be replaced by a birefringent plate; or the birefringent plate may be disposed in a form of layer between the substrate and the polarizing plate, or any combination of these may be used.

When Δn·d of the liquid crystal is not completely adjusted with the birefringent plate and arrangement is so made that a substantially white tone is developed under the conditions that the phase of red is delayed and the phase of blue is advanced, it is found that a display of red is first obtainable with a change of Δn·d of the liquid crystal, and then, the display is changed in the order of blue and green. Use of such technique allows to obtain a white display at an OFF waveform in multiplexing driving without a large optical change of liquid crystal with respect to a voltage, and allows to obtain a display of red, blue and green at a duty ratio of 1/100 or more.

In the multiplexing driving, the smallest effective voltage to be applied to pixels is $V_{OFF}$. It is preferable that design be made to achieve a white display when the $V_{OFF}$ voltage is applied. For this purpose, design should be made so as to compensate a state that liquid crystal molecules are slightly raised, with use of a birefringent plate, whereby a bright white display can be obtained in the multiplexing driving.

Generally, there are two kinds of method to express $\Delta n_2 \cdot d_2$ of the birefringent plate, i.e., one is a spectroscopic method and the other is a measuring method with use of a wavelength in the vicinity of 590 nm. In the spectroscopic method, 500 nm, for instance, indicates Δn·d of 500 nm which is obtained through measurement with use of light having a wavelength of 500 nm. In this embodiment, however, Δn·d means the value obtained by measurement with use of a wavelength in the vicinity of 590 nm. Further, although the value Δn·d is generally changed depending on temperature, the value Δn·d is meant to be such one measured at the room temperature.

The range of Δn·d is preferably determined to be usable in a temperature range of use for the liquid crystal display apparatus so that a beautiful display can be achieved in the temperature range. However, where there is a requirement for outdoor use, the display apparatus may be so constructed as to satisfy the above-mentioned relation only in a part of the temperature range of use. In this case, however, a predetermined display color may not be obtained and the viewing angle characteristics may be deteriorated when the value Δn·d is out of the above-mentioned temperature range.

In the next paragraph, the refractive index of the birefringent plate will be described.

The birefringent plate used in the present invention satisfies a relation of $n_x \geqq n_z \geqq n_y$ wherein $n_x$, $n_y$, $n_z$ represent three main refractive indices, and $n_x$ and $n_y$ represent refractive indices in the direction of film plane of the birefringent plate where $n_x > n_y$ and $n_z$ represents the refractive index in the direction of the thickness of the birefringent plate. The birefringent plate may be a transparent plate which exhibits birefringent properties. Specifically, a biaxially oriented film or a biaxially crystallized plate made of an inorganic material such as mica, niter or the like is used. A case of $n_x > n_z > n_y$ corresponds to a biaxial refringent plate.

In the conventional technique, the optimization of the liquid crystal display element was conducted with respect to light entering into the liquid crystal display element from a perpendicular direction. Namely, it is sufficient to consider use of an uniaxial birefringent plate. However, when the uniaxial birefringent plate is used for compensation, compensation goes well with respect to light entering from the perpendicular direction. However, in a case of light entering from an oblique direction, compensation is insufficient.

In the present invention, determination is made to be $n_x \geqq n_z \geqq n_y$ to thereby prevent a color change of light observed from an oblique direction, and to improve the appearance. When $n_z$ is greater than $n_x$ or smaller than $n_y$, the angular dependence is decreased and the appearance of display observed from an oblique direction is decreased. In particular, further excellent effect is obtainable by satisfying the relation of the abovementioned formula 1. The birefringent plate having such relation is generally called an $N_Z$ plate.

In the birefringent plate of the present invention, deterioration in the quality of display observed from an oblique direction is smaller than that of the uniaxial birefringent plate, and therefore, a color liquid crystal display apparatus having a wide viewing angle can be obtained. In order to obtain a predetermined birefringent effect, Δn and d are adjusted. However, when it is difficult to adjust them by using a single birefringent plate, a plurality of birefringent plates having the same or different property may be combined.

In particular, it is necessary to adjust $n_z$ to improve the angular dependence.

In the present invention, it is preferable to satisfy the relation described in formula 1. When the value is less than 0.2 or more than 0.7, the viewing angle becomes narrow. An $N_Z$=1 (an uniaxial) type birefringent plate is used in view of cost performance and within an admissible tolerance of viewing angle. In the above, description has been made on the assumption that the refractive index $n_z$ in the direction of thickness of the birefringent plate is uniform in the direction of thickness. However, it is not always necessary to be uniform, and it is enough that the refractive index in average in the thickness direction satisfies the above-mentioned condition. The same effect is obtainable even when $n_z$ is ununiform in the thickness direction.

BEST MODE FOR CARRYING OUT THE INVENTION

Figure 10:
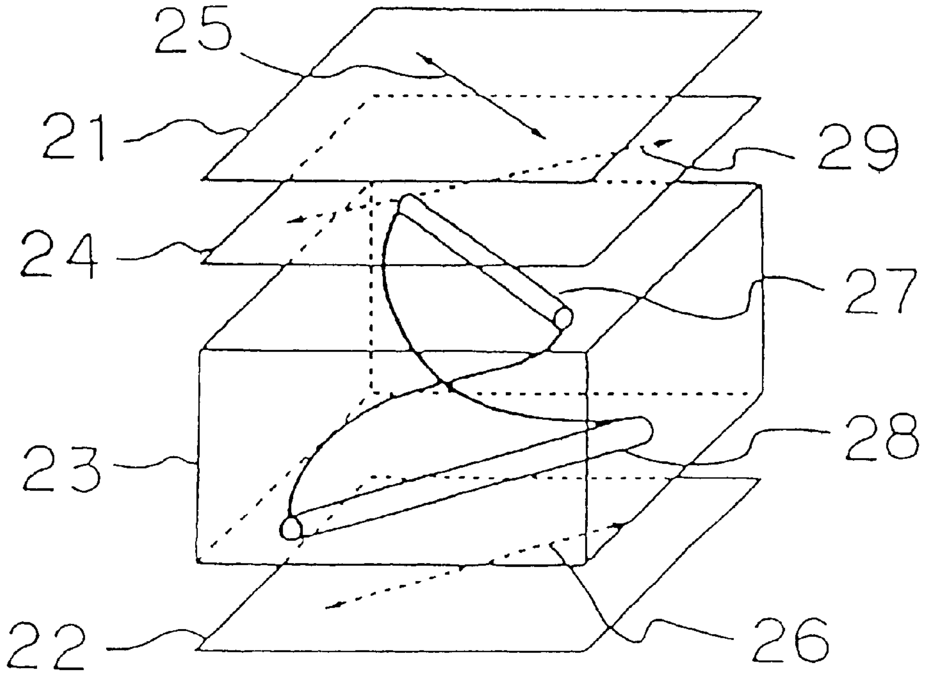
FIG. 10 is a diagram showing the element structure of a liquid crystal cell for SRC-LCD.
Figure 11:
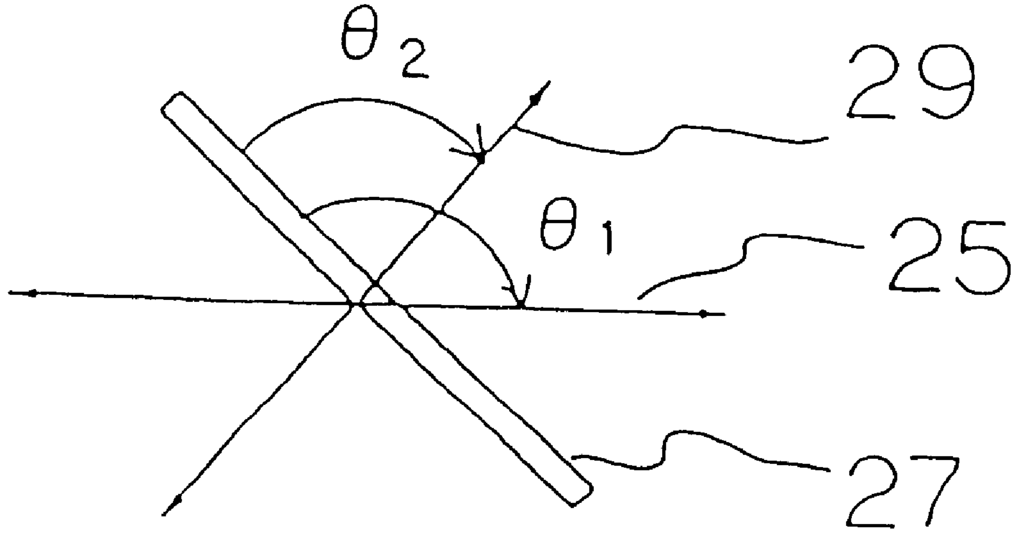
FIG. 11 is a diagram showing an angular relation of each structural elements at an upper side of SRC-LCD.
Figure 12:
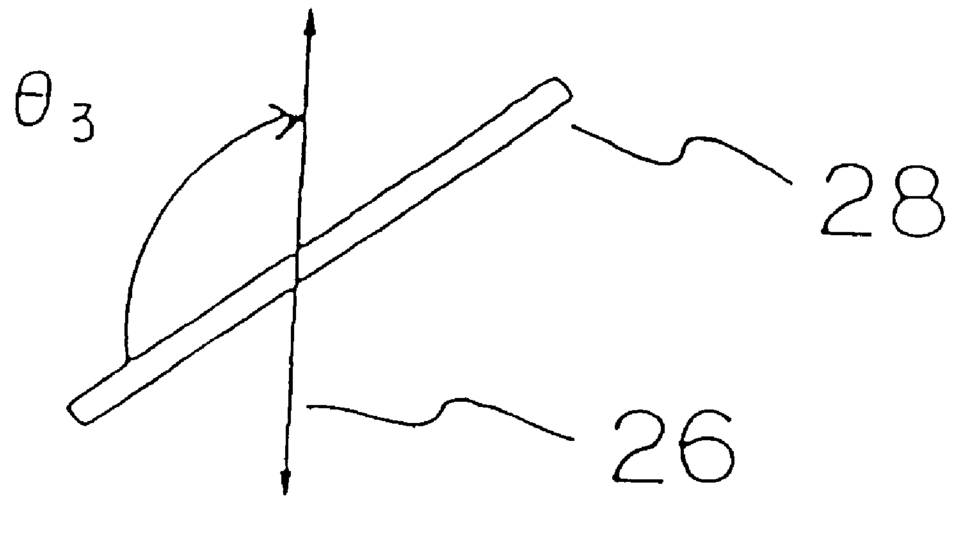
FIG. 12 is a diagram showing an angular relation of structural elements at a lower side of SRC-LCD.

A structure will be described with reference to the drawings. FIG. 10 is a perspective view showing in a form of model the color liquid crystal display apparatus according to the present invention. FIG. 11 is a plane view showing a relation of the direction of the absorbing axis of an upper side polarizing plate, the direction of the slow axis of a birefringent plate comprising a plurality of films and the direction of the long axis of a liquid crystal molecule at an upper side of a liquid crystal layer in a case that the color liquid crystal display apparatus in FIG. 10 is observed from the top. FIG. 12 is a plane view showing a relation of the direction of the absorbing axis of a lower side polarizing plate and the direction of the long axis of a liquid crystal molecule at a lower side of the liquid crystal layer in the same state as in FIG. 11.

In FIG. 10, numerals 21 and 22 designate a pair of polarizing plates; numeral 23 designates a liquid crystal layer for displaying characters and figures, which contains a nematic liquid crystal of positive dielectric anisotropy having $\Delta n_1 \cdot d_1$ of 1.2 μm–2.5 μm and a twist angle of 160°–300°; numeral 24 designates a birefringent plate disposed on the liquid crystal layer; numeral 25 designates the absorbing axis of the polarizing plate placed at an upper side of the liquid crystal layer; numeral 26 designates the absorbing axis of the polarizing plate at a lower side; numeral 27 designates the direction of the long axis of a liquid crystal molecule at an upper side in the liquid crystal layer (i.e., the liquid crystal molecule substantially indicates a direction of orientation); numeral 28 designates the direction of the long axis of a liquid crystal molecule at a lower side in the liquid crystal layer (i.e., the direction of the other orientation) and numeral 29 designates an axis (a slow axis) of a birefringent plate comprising laminated films.

In FIGS. 11 and 12, $\theta_1$ represents an angle obtained by measuring clockwisely the direction of the absorbing axis 25 of the upper side polarizing plate with respect to the direction of the long axis of the upper side liquid crystal molecule 27 in the liquid crystal layer; $\theta_2$ represents an angle obtained by measuring clockwisely the direction of the axis (slow axis) of the upper side (i.e., at the side of the polarizing plate) birefringent plate 24 with respect to the direction of the long axis of the upper side liquid crystal molecules 27 in the liquid crystal layer, and $\theta_3$ represents an angle obtained by measuring clockwisely the direction of the absorbing axis 26 of the lower side polarizing plate with respect to the direction of the long axis of the lower side liquid crystal molecule 28 in the liquid crystal layer.

The birefringent plate in the present invention has different refractive indices in three directions of x, y and z. In determining the three directions, the direction having a larger refractive index in the film plane of the birefringent plate is to be an x axis, the direction having a smaller refractive index is to be a y axis and the direction of thickness is to be a z axis. The refractive indices of the x, y and z axes are respectively $n_x$, $n_y$ and $n_z$ wherein $n_x > n_y$ and $\Delta n_2 = n_x - n_y$. In this case, $n_x > n_z > n_y$. A symbol $d_2$ represents the thickness of the birefringent plate. Here, there is a relation of $N_Z = (n_x - n_z)/(n_x - n_y)$.

In the present invention, the values of $\theta_1$, $\theta_2$ and $\theta_3$, $\Delta n_1 \cdot d_1$ of the liquid crystal layer, the twist angle of the liquid crystal layer, A

| PWM level | 0 | 1 | 2 | 3 | 4 | 5 | 6 | 7 | 8 | 9 |
|---|---|---|---|---|---|---|---|---|---|---|
| Brightness (voltage) level | 0/9 | 1/9 | 2/9 | 3/9 | 4/9 | 5/9 | 6/9 | 7/9 | 8/9 | 9/9 |

TABLE 9

| Sequence Gradation level | Frame #1 | #2 | #3 | #4 |
|---|---|---|---|---|
| 1 | 0 | 1 | 0 | 1 |
| 2 | 1 | 1 | 1 | 2 |
| 3 | 1 | 2 | 1 | 2 |
| 4 | 1 | 2 | 2 | 2 |
| 5 | 2 | 2 | 2 | 2 |
| 6 | 2 | 2 | 2 | 3 |
| 7 | 2 | 3 | 2 | 3 |
| 8 | 2 | 3 | 3 | 3 |
| 9 | 3 | 3 | 3 | 3 |
| 10 | 3 | 3 | 3 | 4 |
| 11 | 3 | 4 | 3 | 4 |
| 12 | 3 | 4 | 4 | 4 |
| 13 | 4 | 4 | 4 | 4 |
| 14 | 4 | 4 | 4 | 5 |
| 15 | 4 | 5 | 4 | 5 |
| 16 | 4 | 5 | 5 | 5 |
| 17 | 5 | 5 | 5 | 5 |
| 18 | 5 | 5 | 5 | 6 |
| 19 | 5 | 6 | 5 | 6 |
| 20 | 5 | 6 | 6 | 6 |
| 21 | 6 | 6 | 6 | 6 |
| 22 | 6 | 6 | 6 | 7 |
| 23 | 6 | 7 | 6 | 7 |
| 24 | 6 | 7 | 7 | 7 |
| 25 | 7 | 7 | 7 | 7 |
| 26 | 7 | 7 | 7 | 8 |
| 27 | 7 | 8 | 7 | 8 |
| 28 | 7 | 8 | 8 | 8 |
| 29 | 8 | 9 | 8 | 9 |

$n_2 \cdot d_2$ of the birefringent plate and $N_Z$ are optimized. Then, there is obtainable a color display apparatus having a wide viewing angle wherein a display of a substantially achromatic color is effected when no voltage is applied and colors of red, blue and green are effected when a voltage is applied.

In the above-mentioned example, a liquid crystal layer of left helical structure is used. However, even in a case of the opposite spiral, the same color display as in a case of the left helical structure can be easily obtained by determining the relations of angles of $\theta_1$, $\theta_2$ and $\theta_3$ with respect to the direction of the long axis of liquid crystal molecules in the liquid crystal layer, the direction of the polarizing axis of the polarizing plates and the direction of the slow axis of the birefringent plate in the counter-clockwise direction.

A liquid crystal cell was formed as described hereinbelow. An ITO transparent electrode was formed on each glass substrate to be in a form of stripe by patterning. An insulating layer was formed on the ITO transparent electrode. Further, an overcoating layer of polyimide was formed on the insulating layer, followed by rubbing it to form an aligning layer, whereby a substrate was produced. The circumferential portion of two substrates thus produced were sealed with a sealing material to thereby form the liquid crystal cell. A nematic liquid crystal of positive dielectric anisotropy was injected into the liquid crystal cell. The injection port was sealed with a sealing material.

EXAMPLE

Now, the present invention will be described in detail with reference to Examples. Example 1 concerns a case of dividing equally 5 portions in PWM and Example 2 concerns a case of dividing equally 9 portions in PWM.

Example 1

The refractive index anisotropy $\Delta n_1$ of the liquid crystal and the thickness $d_1$ of the liquid crystal layer were adjusted so that $\Delta n_1 \cdot d_1$ of the liquid crystal layer was 1.35 μm. Further, determination was so made that $\Delta n_2 \cdot d_2$ of the birefringent plate was 1.46 μm, the twist angle of the liquid crystal layer was 240°, $\theta_1$=140°, $\theta_2$=100° and $\theta_3$=135°. Further, determination of the physical property values of the liquid crystal was so made that $\Delta n$=0.206 and viscosity $\eta$=16.8 cSt (ambient temperature $T_a$=20° C.). Further, $N_Z$=0.6 was determined.

SRC-LCD having a pixel structure of 640×480 was driven. It was found that the frame frequency was 60 Hz and the response speed in average was 120 ms. An a.c. driving was conducted to the liquid crystal by using a successive line driving method of 240 lines wherein polarity inversion was effected in its entirety for each 13 selection.

Figure 7:
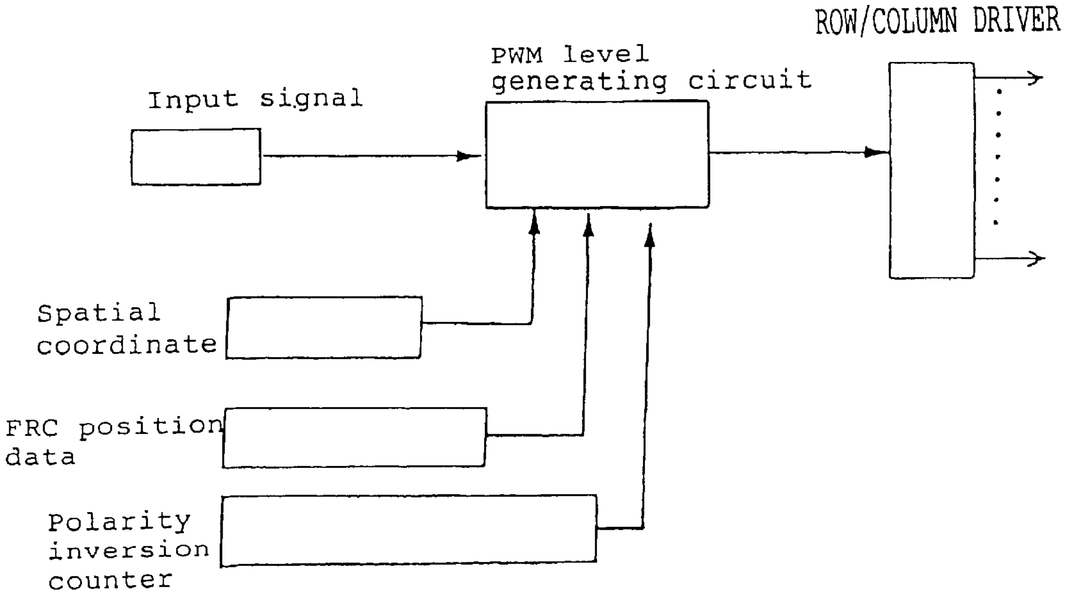
FIG. 7 is a block diagram showing an example of a circuit structure used for the driving method of the present invention.

In this Example, the PWM level generating gradation control circuit shown in FIG. 7 was used for driving. In FIG. 7, a spatial coordinate indicates data representing positions in the directions of row and column respectively, a FRC position data indicates a frame to be displayed at present, and a polarity inversion counter indicates a counter for inverting a polarity of driving waveform at a certain frequency.

Figure 1:
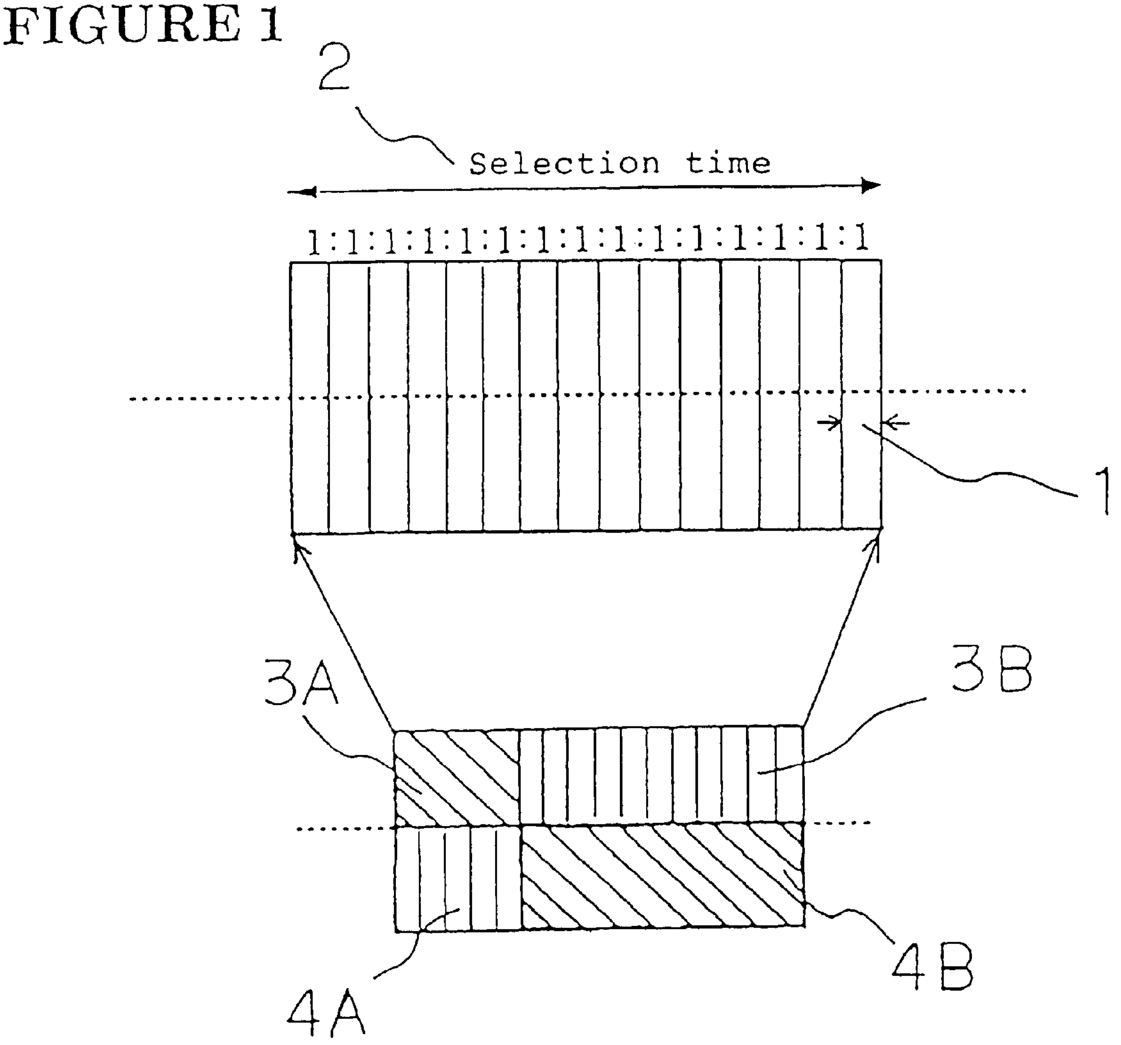
FIG. 1 is a diagram showing an example of a driving waveform in the driving method of the present invention.
Figure 2:
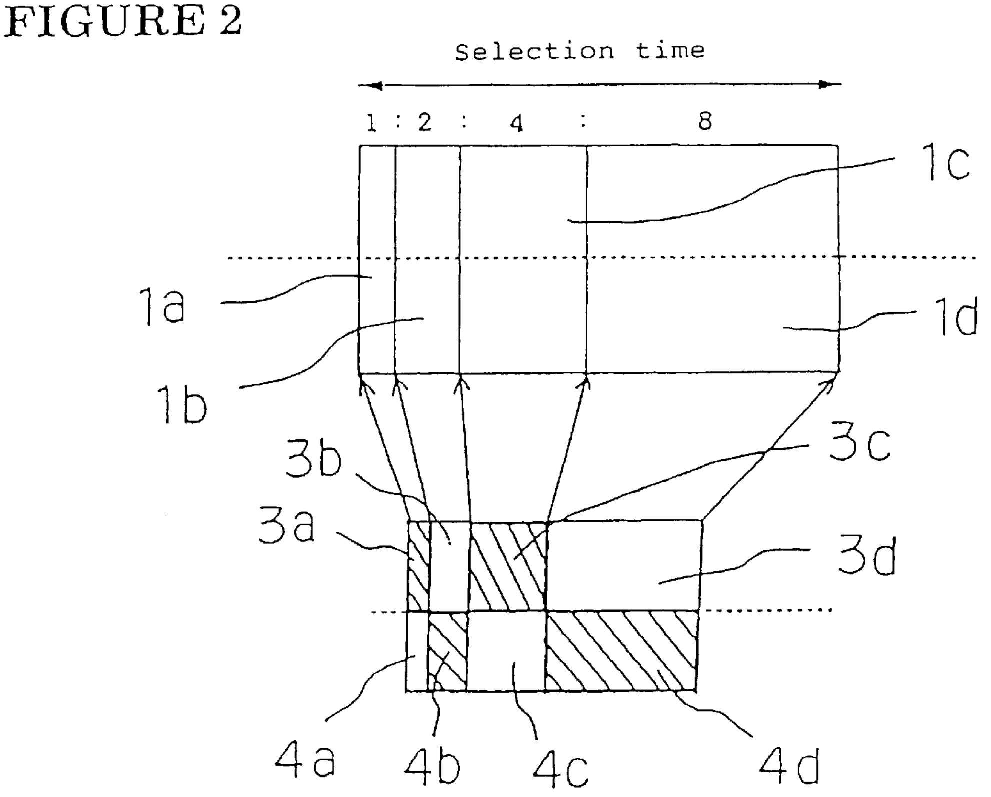
FIG. 2 is a diagram showing a driving waveform in a conventional driving method.
Figure 3:
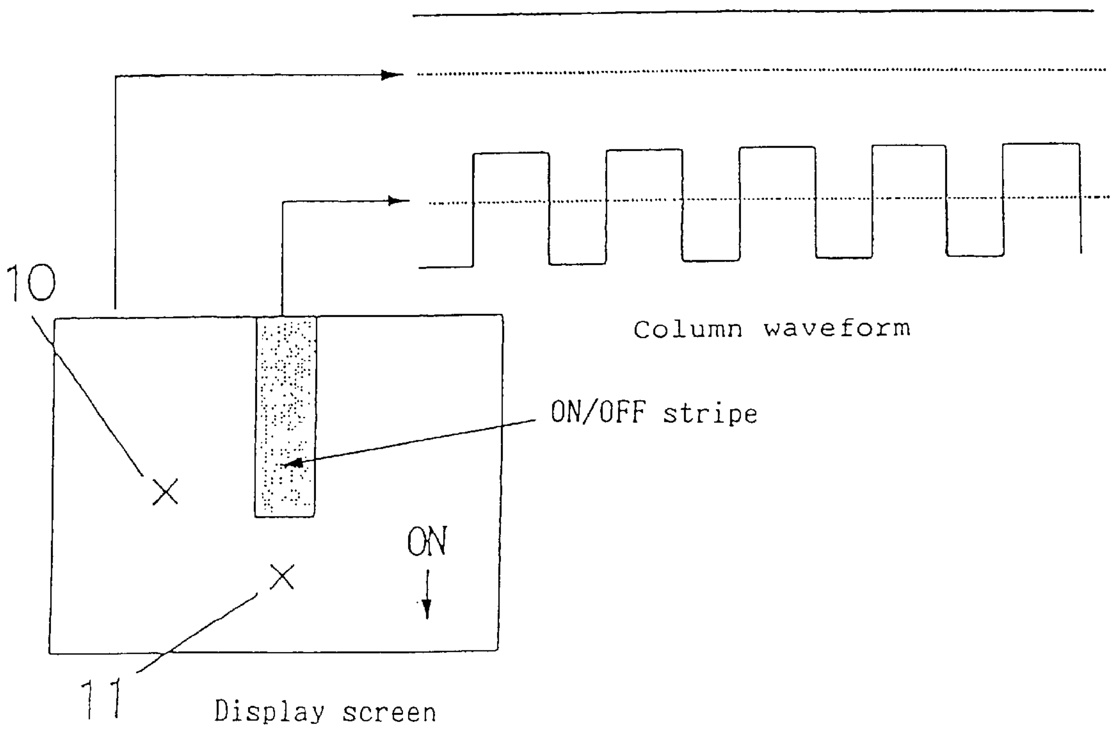
FIG. 3 is a diagram showing a disadvantage in a displayed picture in the conventional method.
Figure 4:
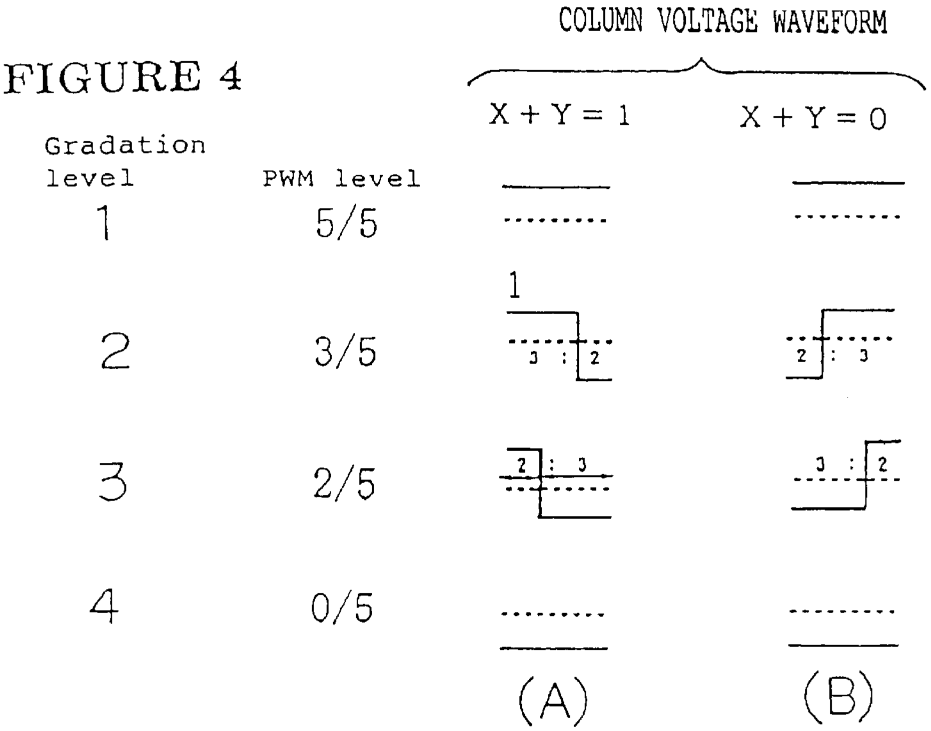
FIG. 4 is a presentation of an embodiment of the basic structure of the driving method of the present invention.
Figure 5:
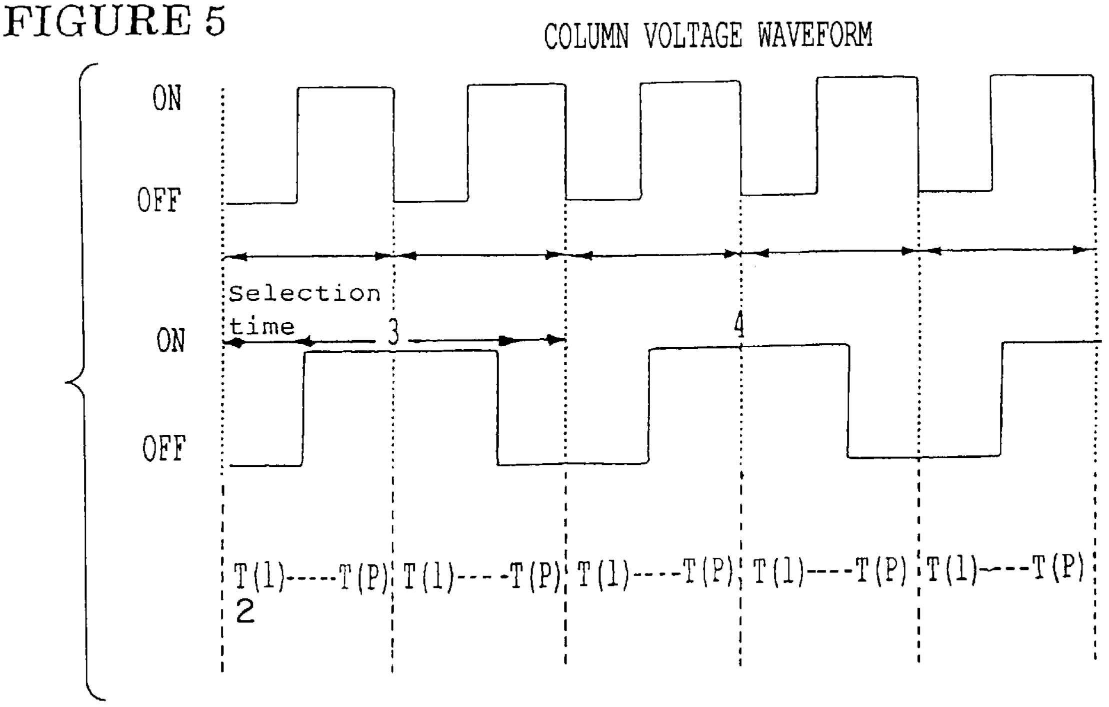
FIG. 5 is a presentation showing an example of a driving waveform of the driving method of the present invention.
Figure 6:
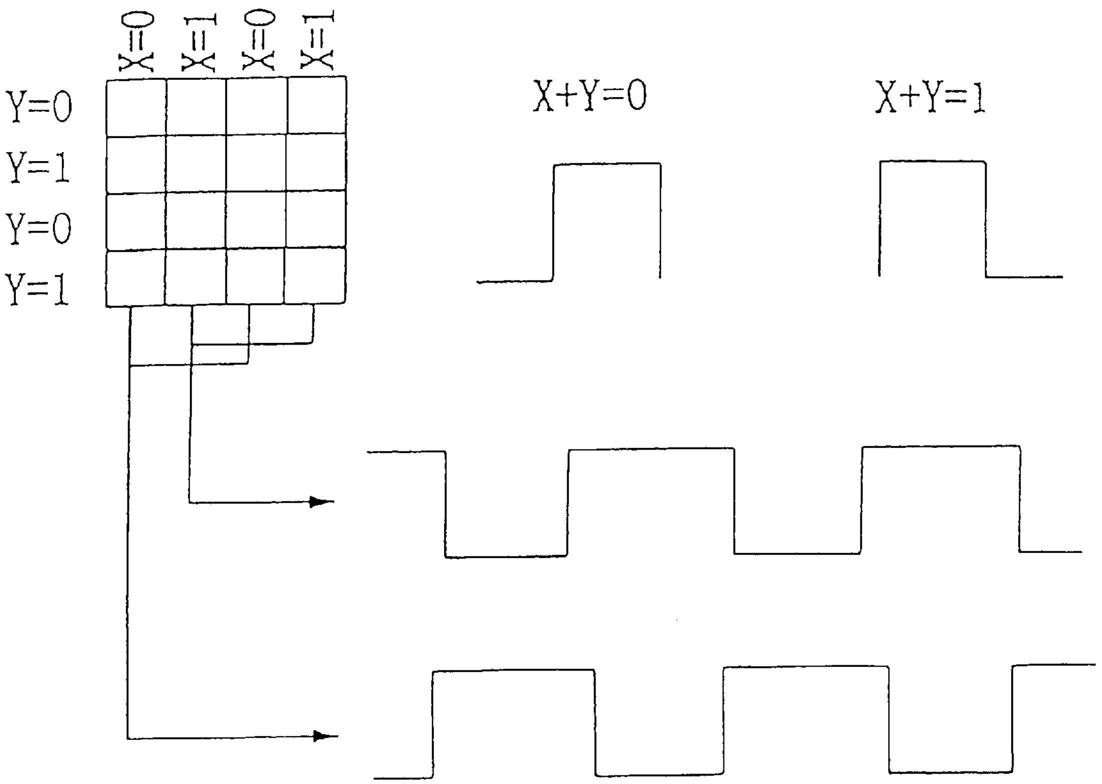
FIG. 6 is a presentation of an example of driving waveforms (positional relation of even and off numbers) of the driving method of the present invention.

In determination of gradations, a level of PWM was divided equally into 5 portions, and 4 levels were used as gradation levels. Four frames were used for FRC. For 4 levels of PWM, the levels of column waveform shown in FIG. 4 were applied. A gradation sequence by PWM for each frame necessary to produce each of gradations was determined based on data in Table 1, and a phase table was used based on data in Table 2. Table 3 shows relations of 4 levels of PWM and brightness (voltage) levels obtained.

TABLE 3

| | | | | |
|---|---|---|---|---|
| PWM level | 1 | 2 | 3 | 4 |
| Brightness (voltage) level | 0/5 | 2/5 | 3/5 | 5/5 |

Example 2

Similarly, a case of 9-uniform division of PWM and use of 4 frames, is described. There are 8 levels as PWM levels as shown in Table 4. A sequence of gradation levels of PWM for each frame necessary to produce each of gradations was determined based on Table 5, and a phase table was determined based on Table 2.

TABLE 4

| PWM level | 1 | 2 | 3 | 4 | 5 | 6 | 7 | 8 |
|---|---|---|---|---|---|---|---|---|
| Brightness (voltage) level | 0/9 | 2/9 | 3/9 | 4/9 | 5/9 | 6/9 | 7/9 | 8/9 |

TABLE 5

| Sequence Gradation level | Frame #1 | #2 | #3 | #4 | |
|---|---|---|---|---|---|
| 1 | 1 | 1 | 1 | 1 | ○ |
| 2 | 1 | 1 | 1 | 2 | ± |
| 3 | 1 | 2 | 1 | 2 | ± |
| 4 | 1 | 2 | 2 | 2 | ± |
| 5 | 2 | 2 | 2 | 2 | ± |
| 6 | 2 | 2 | 2 | 3 | ± |
| 7 | 2 | 3 | 2 | 3 | ± |
| 8 | 2 | 3 | 3 | 3 | ± |

TABLE 5-continued

| Sequence Gradation | Frame | | | | |
|---|---|---|---|---|---|
| level | #1 | #2 | #3 | #4 | |
| 9 | 3 | 3 | 3 | 3 | ± |
| 10 | 3 | 3 | 3 | 4 | ± |
| 11 | 3 | 4 | 3 | 4 | ± |
| 12 | 3 | 4 | 4 | 4 | ± |
| 13 | 4 | 4 | 4 | 4 | ± |
| 14 | 4 | 4 | 4 | 5 | ± |
| 15 | 4 | 5 | 4 | 5 | ± |
| 16 | 4 | 5 | 5 | 5 | ± |
| 17 | 5 | 5 | 5 | 5 | ± |
| 18 | 5 | 5 | 5 | 6 | ± |
| 19 | 5 | 6 | 5 | 6 | ± |
| 20 | 5 | 6 | 6 | 6 | ± |
| 21 | 6 | 6 | 6 | 6 | ± |
| 22 | 6 | 6 | 6 | 7 | ± |
| 23 | 6 | 7 | 6 | 7 | ± |
| 24 | 6 | 7 | 7 | 7 | ± |
| 25 | 7 | 7 | 7 | 7 | ± |
| 26 | 7 | 7 | 7 | 8 | ± |
| 27 | 7 | 8 | 7 | 8 | ± |
| 28 | 7 | 8 | 8 | 8 | ± |
| 29 | 8 | 8 | 8 | 8 | ○ |

Figure 8:
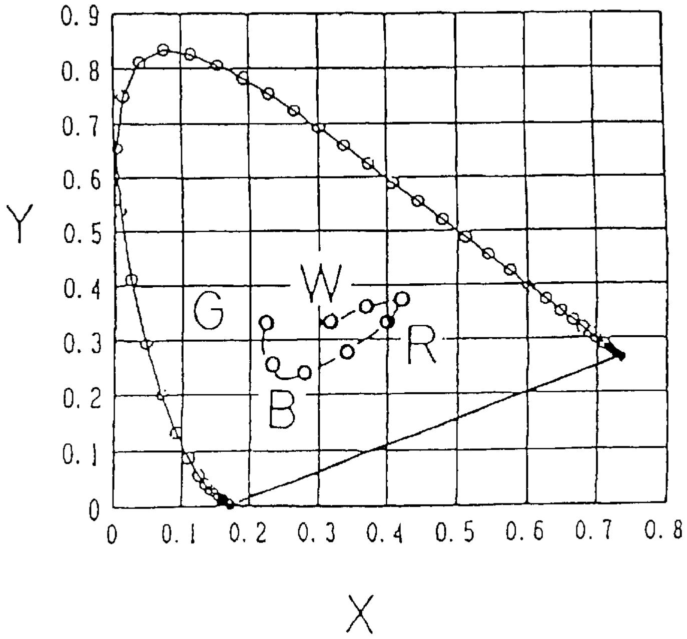
FIG. 8 is a chromaticity diagram showing the first example of color development sequence of SRC-LCD.

As a result, a display of bright white, orange-rich red, dark blue and green could be provided as a value of applied effective voltage became large as shown in the chromaticity diagram of FIG. 8. In this case, the viewing angle became wide in comparison with a case where a uniaxial birefringent plate was used. Further, driving voltage levels could be adjusted at high accuracy, and a desired color could be developed.

Further, when a reflecting plate was provided, a reflection type color liquid crystal display having excellent color purity and wide viewing angle could be achieved. Table 6 shows coordinate data according to the chromaticity diagram. The colors contain noises resulted from portions between lines, where no pixels are formed, in a dot matrix type display element having an aperture rate of about 80%, and the colors substantially correspond to actually recognized colors. The developed colors (color purities) produced from pixel portions have values about 30% better than the values of data in Table 6.

TABLE 6

| V | TR | x | y |
|---|---|---|---|
| 2.40 | 29.479 | 0.310 | 0.343 |
| 2.41 | 29.701 | 0.312 | 0.343 |
| 2.42 | 29.931 | 0.313 | 0.343 |
| 2.43 | 30.121 | 0.314 | 0.343 |
| 2.44 | 30.179 | 0.316 | 0.343 |
| 2.45 | 30.249 | 0.318 | 0.344 |
| 2.46 | 30.173 | 0.321 | 0.345 |
| 2.47 | 29.986 | 0.325 | 0.346 |
| 2.48 | 29.636 | 0.330 | 0.349 |
| 2.49 | 29.09 | 0.336 | 0.352 |
| 2.50 | 28.095 | 0.344 | 0.357 |
| 2.51 | 26.788 | 0.354 | 0.362 |
| 2.52 | 25.047 | 0.366 | 0.369 |
| 2.53 | 22.907 | 0.379 | 0.375 |
| 2.54 | 20.519 | 0.390 | 0.377 |
| 2.55 | 17.984 | 0.395 | 0.370 |
| 2.56 | 15.542 | 0.387 | 0.351 |
| 2.57 | 13.655 | 0.364 | 0.321 |
| 2.58 | 12.293 | 0.326 | 0.286 |
| 2.59 | 11.715 | 0.289 | 0.261 |
| 2.60 | 11.86 | 0.259 | 0.251 |

TABLE 6-continued

| V | TR | x | y |
|---|---|---|---|
| 2.61 | 12.493 | 0.239 | 0.252 |
| 2.62 | 13.473 | 0.226 | 0.262 |
| 2.63 | 14.508 | 0.220 | 0.278 |
| 2.64 | 15.658 | 0.219 | 0.296 |
| 2.65 | 16.696 | 0.220 | 0.316 |
| 2.66 | 17.653 | 0.224 | 0.335 |
| 2.67 | 18.458 | 0.228 | 0.351 |
| 2.68 | 19.186 | 0.233 | 0.365 |
| 2.69 | 19.753 | 0.239 | 0.377 |
| 2.70 | 20.238 | 0.243 | 0.387 |
| 2.71 | 20.672 | 0.248 | 0.395 |
| 2.72 | 20.971 | 0.253 | 0.401 |
| 2.73 | 21.312 | 0.256 | 0.406 |
| 2.74 | 21.587 | 0.259 | 0.409 |
| 2.75 | 21.748 | 0.262 | 0.412 |
| 2.76 | 21.946 | 0.265 | 0.413 |
| 2.77 | 22.11 | 0.267 | 0.415 |
| 2.78 | 22.226 | 0.269 | 0.416 |
| 2.79 | 22.364 | 0.271 | 0.418 |
| 2.80 | 22.409 | 0.273 | 0.418 |

TR: Transmittance

A graph was displayed by using the color liquid crystal display apparatus of this Example. In the graph, the background color was white and three colors of red, blue and green were used for displaying bar graphs. Accordingly, the visibility was substantially improved. Further, in displaying day scheduling, an important meeting was indicated by red to attract attention. Further, in a display for calendar, Saturday and Sunday were indicated by red, weekdays were indicated by blue, and the day corresponding to today was indicated by green. In this case, white was used as the background color.

Sentences were also displayed. White was used as the background color in the same manner as above and characters were indicated by blue. Red-colored marking were used for a block in the sentences. The title was indicated by a green color and underlined portions were indicated by green or red. Further, as a graphic display, white, red, blue and green were used. Many intermediate voltages were used to display whitish red, purple and bluish green whereby a human face could be expressed or the background color could be a colored display.

Thus, in this Example, an environment of good visibility and good workability could be presented in comparison with a simple monochrome display.

Example 3

The refractive index anisotropy $\Delta n_1$ of the liquid crystal and the thickness $d_1$ of the liquid crystal layer were so adjusted that $\Delta n_1 \cdot d_1$ of the liquid crystal layer was 1.7 $\mu$m, $\Delta n_2 \cdot d_2$ of the birefringent plate was 1.8 $\mu$m, the twist angle of the liquid crystal layer was 240°, $\theta_1$=150°, $\theta_2$=95° and $\theta_3$=135°. The physical property values of the liquid crystal were so determined that $\Delta n$=0.206, the viscosity $\eta$=15.1 cSt ($T_a$=20° C.) and $N_Z$=0.6.

Figure 9:
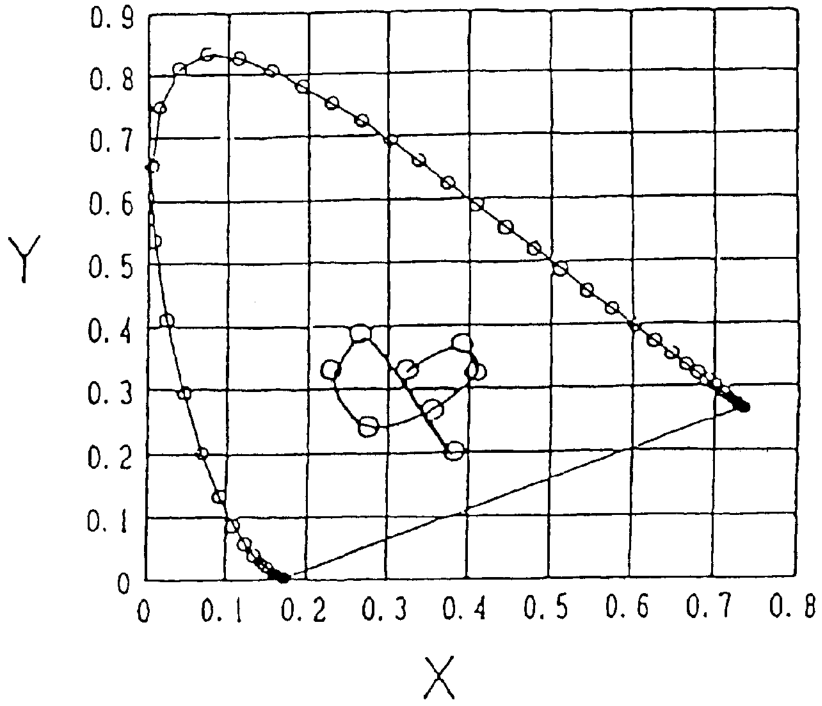
FIG. 9 is a chromaticity diagram showing the second example of color development sequence of SRC-LCD.

A display having a pixel structure of 256×128 dots was effected. Driving was conducted in the same manner as in Example 1. As a result, a display of bright white, orange-rich red, blue, green and pinkish red could be provided as a value of applied effective voltage became large as shown in the chromaticity diagram of FIG. 9. Further, the viewing angle became wide in comparison with a case using an uniaxial birefringent plate. Further, when a reflecting plate was used, a reflection type color liquid crystal display having excellent color purity and a wide viewing angle could be provided.

In the same manner as in Example 1, displays of graphs, day scheduling, sentences and graphic displays were carried out. Table 7 shows coordinate data in the chromaticity diagram of this Example. In particular, a pink color which was not obtainable could be developed.

TABLE 7

| V | TR | x | y |
|---|---|---|---|
| 2.00 | 31.388 | 0.324 | 0.358 |
| 2.01 | 31.508 | 0.324 | 0.356 |
| 2.02 | 31.685 | 0.324 | 0.354 |
| 2.03 | 31.811 | 0.324 | 0.352 |
| 2.04 | 31.641 | 0.324 | 0.350 |
| 2.05 | 31.562 | 0.325 | 0.349 |
| 2.06 | 31.247 | 0.327 | 0.347 |
| 2.07 | 30.723 | 0.329 | 0.346 |
| 2.08 | 29.87 | 0.332 | 0.344 |
| 2.09 | 28.595 | 0.337 | 0.345 |
| 2.10 | 26.636 | 0.345 | 0.347 |
| 2.11 | 24.267 | 0.355 | 0.350 |
| 2.12 | 21.025 | 0.369 | 0.355 |
| 2.13 | 17.648 | 0.382 | 0.358 |
| 2.14 | 14.304 | 0.380 | 0.349 |
| 2.15 | 12.117 | 0.343 | 0.318 |
| 2.16 | 11.962 | 0.279 | 0.280 |
| 2.17 | 14.344 | 0.237 | 0.275 |
| 2.18 | 18.245 | 0.230 | 0.308 |
| 2.19 | 22.275 | 0.252 | 0.365 |
| 2.20 | 24.353 | 0.289 | 0.414 |
| 2.21 | 24.741 | 0.326 | 0.431 |
| 2.22 | 23.857 | 0.350 | 0.413 |
| 2.23 | 22.537 | 0.359 | 0.380 |
| 2.24 | 21.130 | 0.360 | 0.348 |
| 2.25 | 19.919 | 0.359 | 0.323 |
| 2.26 | 18.977 | 0.356 | 0.305 |
| 2.27 | 18.231 | 0.355 | 0.293 |
| 2.28 | 17.714 | 0.354 | 0.285 |
| 2.29 | 17.316 | 0.353 | 0.280 |
| 2.30 | 16.927 | 0.352 | 0.276 |
| 2.31 | 16.685 | 0.352 | 0.273 |
| 2.32 | 16.484 | 0.352 | 0.271 |
| 2.33 | 16.351 | 0.353 | 0.271 |
| 2.34 | 16.244 | 0.353 | 0.270 |
| 2.35 | 16.167 | 0.353 | 0.269 |
| 2.36 | 16.084 | 0.354 | 0.268 |
| 2.37 | 16.006 | 0.354 | 0.269 |
| 2.38 | 15.995 | 0.355 | 0.268 |
| 2.39 | 16.029 | 0.356 | 0.269 |
| 2.40 | 15.994 | 0.356 | 0.268 |
| 2.41 | 16.012 | 0.357 | 0.269 |
| 2.42 | 16.018 | 0.357 | 0.268 |
| 2.43 | 16.054 | 0.357 | 0.269 |
| 2.44 | 16.053 | 0.358 | 0.269 |
| 2.45 | 16.012 | 0.358 | 0.269 |
| 2.46 | 16.088 | 0.359 | 0.269 |
| 2.47 | 16.183 | 0.359 | 0.269 |
| 2.48 | 16.127 | 0.359 | 0.270 |
| 2.490 | 16.187 | 0.359 | 0.270 |
| 2.500 | 16.211 | 0.360 | 0.270 |

TR: Transmittance

Example 4

The refractive index anisotropy $\Delta n_1$ of the liquid crystal and the thickness $d_1$ of the liquid crystal layer were so adjusted that $\Delta n_1 \cdot d_1$ of the liquid crystal layer was 1.24 μm. Determination was so made that $\Delta n_2 \cdot d_2$ of the birefringent plate was 1.4 μm, the twist angle of the liquid crystal layer was 240°, $\theta_1$=125°, $\theta_2$80° and $\theta_3$=140°. As the physical property values of the liquid crystal used, Δn=0.190, the viscosity η=15.1 cSt ($T_a$=20° C.) and $N_Z$=1.0. A display is effected by the same driving method as in Example 1. In this Example, a very bright display could be obtained as the background color when no voltage was applied. The display could be employed as a display for a hand-held type telephone usable for individuals.

Example 5

A monochrome STN in place of the above-mentioned SRC-LCD was prepared as follows. The refractive index anisotropy Δn, of the liquid crystal and the thickness $d_1$ of the liquid crystal layer were so adjusted that $\Delta n_1 \cdot d_1$ of the liquid crystal layer was 0.846 μm. Determination was so made that $\Delta n_2 \cdot d_2$ of the birefingent plate was 0.57 μm, the twist angle of the liquid crystal layer was 240°, $\theta_1$=130°, $\theta_2$=90° and $\theta_3$=132°. As the physical property values of the liquid crystal used, Δn=0.141, the viscosity η=15.1 cSt ($T_a$=20° C.) and $N_Z$=0.5.

A LCD module having a pixel structure of 640×480 matrix was formed. A case of P=1 was employed for driving to effect a display of characters or graphs. As a result, a beautiful display without any cross-talk could be obtained in comparison with the conventional technique. Further, an instantaneous load of the power source was decreased and peak noises in average were reduced.

Example 6

The refractive index anisotropy $\Delta n_1$ of the liquid crystal and the thickness $d_1$ of the liquid crystal layer were so adjusted that $\Delta n_1 \cdot d_1$ was 1.27 μm. Determination was so made that $\Delta n_2 \cdot d_2$ of the birefringent plate was 1.40 μm, the twist angle of the liquid crystal layer was 2400, $\theta_1$=1250, $\theta_2$=800 and $\theta_3$=1400.

As the physical property values of the liquid crystal used Δn=0.196, $T_a$=99° C., the dielectric anisotropy was 15 and the viscosity was 24 cSt ($T_a$=20° C.). Liquid crystal of lower frequency dependence was used to improve the operational performance in a low temperature range. More detail, liquid crystal wherein the ratio of $V_{th}$ obtained by driving the liquid crystal with a sine wave at 3 kHz and 400 Hz ($V_{th}$(3 kHz)/$V_{th}$(400 Hz)) was 1.30, was used. As a result, it was possible to reduce frequency dependence in the dielectric anisotropy of the liquid crystal in a low temperature region.

The panel could provide a display of bright white, orange-rich red, dark blue and green as a value of applied effective voltage became large. A color display was effected by using the same gradation technique as in Example 2 and using 4 levels among 29 gradations at a duty ratio of 1/55.

For bright white, a sequence gradation level 1 in Table 5 was used. For orange-rich red, a sequence gradation level 13 in Table 5 was used. For dark blue, a sequence gradation level 24 in Table 5 was used. For green, a sequence gradation level 29 in Table 5 was used.

This Example was suitable for a hand-held telephone. In order to reduce the weight, a glass substrate of 0.4 mm thick was used. The panel could be recognized in a usable temperature range of −20° C. to 60° C., and it exhibits excellent characteristics as a liquid crystal display element mounted on a hand-held telephone practically usable.

Example 7

The same structure as in Example 6 was prepared except that the liquid crystal was changed. Liquid crystal of Δn=0.195, $T_c$=98.5° C., dielectric anisotropy: 17, viscosity: 20 cSt and $V_{th}$(3 kHz)/$V_{th}$(400 Hz): 1.04, and including a trans-difluoroethylene derivative as composition, was used. In this Example, since the viscosity of the liquid crystal was determined to be small, response in display was fast.

Driving was conducted at a duty ratio of 1/55 and a bias of 1/6, whereby frame response at a high temperature region was controlled and reduction of color development was low.

Example 8

The same construction as in Example 6 was prepared except that Δn of the liquid crystal was 0.212 and the cell gap was 6 um. In this Example, since the cell gap was thin, response in display was fast.

Example 9

In the same manner as in Example 2, a case of 9-uniform division of PWM and use of 4 frames is described. PWM levels were 10 levels from 0 to 9 as shown in Table 8: the sequence of gradation levels by PWM for frames necessary to produce each gradation was that in Table 9 and the phase table was that in Table 2.

A sequence gradation level 1 was used for the background color. A sequence gradation level 10, a sequence gradation level 18 or a sequence gradation level 29 was used for displaying characters. A display was effected in the same manner as in Example 2. In comparison with Example 2 wherein the color tone or the brightness of the background color in upper and lower portions of columns including a character displaying portion was changed (cross-talk), this example could substantially reduce cross-talk.

TABLE 8

| PWM level | 0 | 1 | 2 | 3 | 4 | 5 | 6 | 7 | 8 | 9 |
|---|---|---|---|---|---|---|---|---|---|---|
| Brightness (voltage) level | 0/9 | 1/9 | 2/9 | 3/9 | 4/9 | 5/9 | 6/9 | 7/9 | 8/9 | 9/9 |

TABLE 9

| Sequence Gradation | Frame | | | |
|---|---|---|---|---|
| level | #1 | #2 | #3 | #4 |
| 1 | 0 | 1 | 0 | 1 |
| 2 | 1 | 1 | 1 | 2 |
| 3 | 1 | 2 | 1 | 2 |
| 4 | 1 | 2 | 2 | 2 |
| 5 | 2 | 2 | 2 | 2 |
| 6 | 2 | 2 | 2 | 3 |
| 7 | 2 | 3 | 2 | 3 |
| 8 | 2 | 3 | 3 | 3 |
| 9 | 3 | 3 | 3 | 3 |
| 10 | 3 | 3 | 3 | 4 |
| 11 | 3 | 4 | 3 | 4 |
| 12 | 3 | 4 | 4 | 4 |
| 13 | 4 | 4 | 4 | 4 |
| 14 | 4 | 4 | 4 | 5 |
| 15 | 4 | 5 | 4 | 5 |
| 16 | 4 | 5 | 5 | 5 |
| 17 | 5 | 5 | 5 | 5 |
| 18 | 5 | 5 | 5 | 6 |
| 19 | 5 | 6 | 5 | 6 |
| 20 | 5 | 6 | 6 | 6 |
| 21 | 6 | 6 | 6 | 6 |
| 22 | 6 | 6 | 6 | 7 |
| 23 | 6 | 7 | 6 | 7 |
| 24 | 6 | 7 | 7 | 7 |
| 25 | 7 | 7 | 7 | 7 |
| 26 | 7 | 7 | 7 | 8 |
| 27 | 7 | 8 | 7 | 8 |
| 28 | 7 | 8 | 8 | 8 |
| 29 | 8 | 9 | 8 | 9 |

Industrial Applicability

In accordance with the present invention wherein a PWM method and a FRC method are employed together, a multivalued driving method necessary for SRC-LCD can be provided in a precise manner. Further, in driving, a display of good quality and less flicker can be provided and reduction of power consumption rate and simplification of circuit system can be realized.

In the present invention, the phase of signal waveforms of driving voltages applied to pixels is controlled whereby frequency components are dispersed in terms of space or time, and accordingly, cross-talking in a displayed picture can be suppressed. For instance, when the phase of voltages is controlled between adjacent column electrodes, a load to the power source can be reduced, and accordingly, cross-talking in a displayed picture can be suppressed.

According to the present invention, in a liquid crystal display element or a liquid crystal module of small or medium size to which a passive driving method is applied, when a multi-value display is effected in SRC-LCD, for instance, when a plurality of colors is displayed, or a gray scale display in the ordinary monochrome STN (including CF) is effected, a display of high visibility and less cross-talking can be obtained.

In particular, the total characteristics of the liquid crystal module including the liquid crystal display apparatus and the driving circuit are improved to provide a device having good cost performance. Further, the present invention can be applicable to various purposes of use as far as the effect of the present invention is not reduced.

What is claimed is:

1. A driving method for a passive matrix type LCD having a plurality of row electrodes applied with row voltages and a plurality of column electrodes applied with column voltages comprising the steps of:

dividing a selection time for a predetermined pixel into a P number of time periods, wherein P is a positive integer >2;

providing said time-periods time-sequentially by T(1) to T(P);

applying said column voltages corresponding to T(1) to T(P) wherein said column voltages are in one of an ON level and an OFF level; and limiting a number of changes between the ON level and the OFF level of said column voltages in the selection time for the predetermined pixel to at most once by changing the phase of said column voltage of said predetermined pixel each next selection time.

2. A driving method for the LCD according to claim 1, wherein when there are voltage levels of the ON level and the OFF level on a column electrode in the selection time for the predetermined pixel to be selected, the same voltage level as a voltage level in T(P) on a column electrode in a preceding timing is applied to said column electrode in T(1), wherein the preceding timing is selected just before the next timing of said column electrode.

3. A driving method for the LCD according to claim 1, wherein when a voltage level on a column electrode in T(1) in the selection time for the predetermined pixel is the ON level and an adjacent column electrode to said column electrode is applied with one of the ON level and the OFF level, the OFF level is applied to the adjacent column electrode in T(1), and when a voltage level on the column electrode in T(1) in the selection time for the predetermined pixel is the OFF level and an adjacent column electrode in a column adjacent to said column electrode is applied with one of the ON level and the OFF level, the ON level is applied to the adjacent column electrode in T(1).

4. A driving method for the LCD according to claim 1, wherein when a voltage level applied to a column electrode in T(P) in the selection time for the predetermined pixel is the ON level and a voltage level applied to an adjacent column electrode adjacent to said column electrode is one of the ON level and the OFF level, a voltage level in T(P) on the adjacent column electrode adjacent to said column electrode is the OFF level, and when a voltage level applied to the column electrode in T(P) in the selection time for the predetermined pixel is the ON level and a voltage level applied to an adjacent column electrode to a predetermined column is one of the ON level and the OFF level, a voltage level in T(P) on the adjacent column electrode to said column electrode is the OFF level.

5. A driving method for LCD according to claim 1, wherein P is 16 or lower.

6. A driving method for the LCD according to claim 1, wherein in satisfaction of $W*1/P\leqq 0.25$ and on column electrodes in the selection time for the predetermined pixel, there is no change from the ON level to the OFF level and from the OFF level to the ON level between at least one of the pairs (T(1), T(W)) and (T(P−W), T(P)), wherein W is the greatest integer.

7. A driving method for the LCD according to claim 1, wherein when the ratio of a time of the ON level to the selection time for the predetermined pixel is R, and a (P+1) number of different R(S) values are determined by R(S)=(1/P)*S*100%, and X frames including a Q or lower number of different R(S) values are used as a unit to drive the LCD, wherein (0<R(S)<100%), S is an integer of any value P or lower including 0, and X is a predetermined number.

8. A driving method for LCD according to claim 7, wherein a difference between R(S) values in X frames does not exceed 30%.

9. A driving method for the LCD according to claim 1, wherein X is a predetermined number that is 7 or lower.

10. A driving method for the LCD according to claim 7, wherein all R(S) values in X frames are not 0% and 100%.

11. A driving method for the LCD according to claim 2, wherein when a voltage level on a column electrode in T(1) in the selection time for the predetermined pixel is an ON level and an adjacent column electrode adjacent to said column electrode is applied with one of the ON level and the OFF level, the OFF level is applied to the adjacent column electrode in T(1), and when a voltage level on the column electrode in T(1) in the selection time for the predetermined pixel is the OFF level and an adjacent column electrode in a column adjacent to said column electrode is applied with one of the ON level and the OFF level, the ON level is applied to the adjacent column electrode in T(1).

12. A driving method for the LCD according to claim 2, wherein when a voltage level applied to a column electrode in T(P) in the selection time for the predetermined pixel is the ON level and a voltage level applied to a column electrode adjacent to said column electrode is one of the ON level and the OFF level, a voltage level in T(P) on a column electrode adjacent to said column electrode is the OFF level, and when the voltage level applied to a column electrode in T(P) in the selection time for the predetermined pixel is the OFF level and a voltage level applied to a column electrode adjacent to a predetermined column is one of the ON level and the OFF level, a voltage level in T(P) one a column electrode adjacent to said column electrode is the ON level.

13. A driving method for LCD according to claim 2, wherein P is 16 or lower.

14. A driving method for LCD according to claim 3, wherein P is 16 or lower.

15. A driving method for LCD according to claim 4, wherein P is 16 or lower.

16. A driving circuit for a passive matrix type LCD comprising:

a PWM level generating gradation control circuit for producing at least 4 intermediate voltage levels; and a row/column output driver circuit for producing driving voltages from said at least 4 intermediate voltage levels to be applied to row electrodes and column electrodes so that row voltages are applied to the row electrodes and column voltages are applied to the column electrodes and for dividing a selection time for a predetermined LCD pixel into a P number of time periods, wherein when the time periods are represented time-sequentially by T(1) to T(P), said column voltages corresponding to T(1) to T(P) are in one of an ON level and an OFF level, a number of changes between the ON level and the OFF level in the selection time is at most once, and P is a positive integer.

17. A driving circuit for the LCD according to claim 16, wherein said driving circuit produces at least 16 intermediate voltage levels.

18. A driving circuit for LCD according to claim 16, wherein the number of the column electrodes is at least 60.

19. A driving circuit for a passive matrix type LCD comprising:

a PWM level generating gradation control circuit configured to produce at least 4 intermediate voltage levels;

a spatial coordinate circuit configured to indicate data representing positions in directions of rows and columns, respectively;

an FRC position data circuit configured to indicate a frame being displayed;

a polarity inversion counter circuit configured to invert a polarity of a driving waveform at a predetermined frequency; and a row/column output driver circuit configured to produce driving voltages from said at least 4 intermediate voltage levels to be applied to row electrodes and column electrodes so that row voltages are applied to the row electrodes and column voltages are applied to the column electrodes and for dividing a selection time for a predetermined LCD pixel into a P number of time periods, wherein when the time periods are represented time-sequentially by T(1) to T(P), said column voltages corresponding to T(1) to T(P) are in one of an ON level and an OFF level, a number of changes between the ON level and the OFF level in the selection time is at most once, and P is a positive integer.

20. A driving circuit means for LCD of a passive matrix type comprising:

means for producing at least 4 intermediate voltage levels;

means for indicating data representing positions in directions of rows and columns, respectively;

means for indicating a frame being displayed;

means for inverting a polarity of a driving waveform at a predetermined frequency; and means for producing driving voltages from said at least 4 intermediate voltage levels to be applied to row electrodes and column electrodes so that row voltages are applied to the row electrodes and column voltages are applied to the column electrodes and for dividing a selection time for a predetermined LCD pixel into a P number of time periods, wherein when the time periods are represented time-sequentially by T(1) to T(P), said column voltages corresponding to T(1) to T(P) are in at least one of an ON level and an OFF level, a number of changes between the ON level and the OFF level in the selection time is at most once, and P is a positive integer.

* * * * *

UNITED STATES PATENT AND TRADEMARK OFFICE

CERTIFICATE OF CORRECTION

PATENT NO. : 6,519,013 B1
DATED : February 11, 2003
INVENTOR(S) : Nagai et al.

It is certified that error appears in the above-identified patent and that said Letters Patent is hereby corrected as shown below:

Title page, Item [54] and Column 1, lines 1 and 2,
Should read:

-- [54] DRIVING METHOD FOR LCD, LCD MODULE AND DRIVING CIRCUIT FOR LCD --

Signed and Sealed this

Seventeenth Day of June, 2003

JAMES E. ROGAN
*Director of the United States Patent and Trademark Office*